(12) United States Patent
Luo et al.

(10) Patent No.: US 12,309,536 B2
(45) Date of Patent: May 20, 2025

(54) IMAGE PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Yonglin Luo, Shenzhen (CN); Chang Liu, Shenzhen (CN); Lei Sun, Shenzhen (CN); Zirong Zhu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 18/587,667

(22) Filed: Feb. 26, 2024

(65) Prior Publication Data

US 2024/0205376 A1 Jun. 20, 2024

Related U.S. Application Data

(63) Continuation of application No. PCT/CN2023/121004, filed on Sep. 25, 2023.

(30) Foreign Application Priority Data

Sep. 30, 2022 (CN) .................. 202211206631.X

(51) Int. Cl.
*H04N 9/64* (2023.01)
*G06T 5/92* (2024.01)
*H04N 5/268* (2006.01)

(52) U.S. Cl.
CPC ............... *H04N 9/646* (2013.01); *G06T 5/92* (2024.01); *H04N 5/268* (2013.01);
(Continued)

(58) Field of Classification Search
CPC ............ H04N 9/646; H04N 9/64; H04N 9/77; H04N 9/76; H04N 5/268; H04N 7/01;
(Continued)

(56) References Cited

U.S. PATENT DOCUMENTS

2023/0283911 A1* 9/2023 Yamanaka ............. H04N 5/202
382/274

FOREIGN PATENT DOCUMENTS

CN 115293994 A 11/2022

OTHER PUBLICATIONS

International Search Report and Written Opinion received for PCT Patent Application No. PCT/CN2023/121004 with English Translation, mailed on Dec. 25, 2023, 8 pages.

* cited by examiner

*Primary Examiner* — Sherrie Hsia
(74) *Attorney, Agent, or Firm* — ARENTFOX SCHIFF LLP

(57) ABSTRACT

In an image processing method, for each video image of a plurality of video images of an original video, a first image generated by format conversion of the respective video image is acquired. The respective video image is represented by a first color representation. The first image is represented by a second color representation. An image dynamic range supported by the second color representation is wider than an image dynamic range supported by the first color representation. An image dynamic range of the first image is the same as an image dynamic range of the respective video image. A second image that is based on the respective video image is acquired. The second image is represented by the second color representation. An image dynamic range of the second image is wider than the image dynamic range of the respective video image. A fusion weight value of each pixel of a plurality of pixels in a target image is determined (Continued)

according to a display order of the respective video image in the original video, the target image being one of the first image and the second image. A fusion weight map is generated based on the fusion weight value of each pixel of the plurality of pixels in the target image. A fusion image corresponding to the respective video image is generated based on the target image, a base image, and the fusion weight map, the base image being another one of the first image and the second image. A fusion video is generated based on the fusion images corresponding to the plurality of video images.

20 Claims, 9 Drawing Sheets

(52) U.S. Cl.
CPC ............... *G06T 2207/10016* (2013.01); *G06T 2207/20208* (2013.01); *G06T 2207/20221* (2013.01)

(58) Field of Classification Search
CPC .... G06T 5/92; G06T 5/00; G06T 5/50; G06T 2207/10016; G06T 2207/20208; G06T 2207/20221
USPC .......................... 348/708, 441, 453, 712, 713
See application file for complete search history.

202
For each video image in a plurality of video images of an original video, acquire a first image generated by format conversion of a targeted video image, each video image being represented by a first color representation, the first image being represented by a second color representation, an image dynamic range supported by the second color representation being wider than an image dynamic range supported by the first color representation, and an image dynamic range of the first image being the same as an image dynamic range of the targeted video image 204
Acquire a second image, the second image having consistent image content with the targeted video image and being represented by the second color representation, and an image dynamic range of the second image being wider than the image dynamic range of the targeted video image 206
Use one of the first image or the second image as a target image, and use the other of the first image or the second image as a base image 208
Determine a fusion weight value of each pixel in the target image according to a display order of the targeted video image in the original video, and generate a fusion weight map based on the fusion weight value of each pixel in the target image 210
Fuse the target image and the base image based on the fusion weight map, to generate a fusion image corresponding to the targeted video image 212
Generate a fusion video based on fusion images respectively corresponding to the plurality of video images

FIG. 2

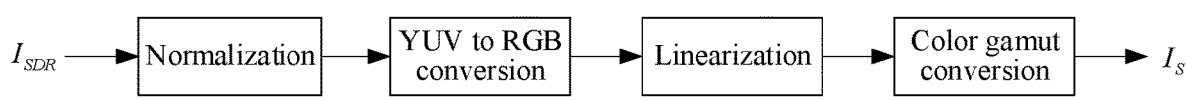

FIG. 3

IMAGE PROCESSING METHOD AND APPARATUS, COMPUTER DEVICE, AND STORAGE MEDIUM

RELATED APPLICATIONS

The present application is a continuation of International Application No. PCT/CN2023/121004, filed on Sep. 25, 2023, which claims priority to Chinese Patent Application No. 202211206631X, filed on Sep. 30, 2022 and entitled "IMAGE PROCESSING METHOD AND APPARATUS, COMPUTER DEVICE, AND STORAGE MEDIUM." The entire disclosures of the prior applications are hereby incorporated by reference.

FIELD OF THE TECHNOLOGY

This disclosure relates to the field of image processing technologies, including to an image processing method and apparatus, a computer device, and a storage medium.

BACKGROUND OF THE DISCLOSURE

With the development of Internet technologies, images have become a channel for obtaining information quickly and intuitively. An image or a video may be an image with any type of dynamic range. The any type of dynamic range includes but is not limited to a standard dynamic range (SDR), a high dynamic range (HDR), and a pseudo HDR. Currently, in many scenarios, a need to convert an image with one type of dynamic range into an image with another type of dynamic range may exist. For example, a need to convert an SDR image in a video into an HDR image exists.

In a related technology, an image with one type of dynamic range is converted into an image with another type of dynamic range by performing image processing on the image itself.

However, a problem of style inconsistency can exist in an image generated by performing image processing directly on an image, resulting in poor display effect of the generated image. In addition, a method for performing image processing on the image itself has high computational complexity, resulting in waste of hardware resources in a process of image processing.

SUMMARY

Based on this, with respect to the foregoing technical problem, aspects of the present disclosure include an image processing method and apparatus, a computer device, a non-transitory computer-readable storage medium, and a computer program product.

According to an aspect, this disclosure provides an image processing method. The method may be performed by a computer device. In the image processing method, for each video image of a plurality of video images of an original video, a first image generated by format conversion of the respective video image is acquired. The respective video image is represented by a first color representation. The first image is represented by a second color representation. An image dynamic range supported by the second color representation is wider than an image dynamic range supported by the first color representation. An image dynamic range of the first image is the same as an image dynamic range of the respective video image. A second image that is based on the respective video image is acquired. The second image is represented by the second color representation. An image dynamic range of the second image is wider than the image dynamic range of the respective video image. A fusion weight value of each pixel of a plurality of pixels in a target image is determined according to a display order of the respective video image in the original video, the target image being one of the first image and the second image. A fusion weight map is generated based on the fusion weight value of each pixel of the plurality of pixels in the target image. A fusion image corresponding to the respective video image is generated based on the target image, a base image, and the fusion weight map. The base image is another one of the first image and the second image. A fusion video is generated based on the fusion images corresponding to the plurality of video images.

According to another aspect, this disclosure further provides an image processing apparatus. The apparatus includes processing circuitry configured to, for each video image of a plurality of video images of an original video, acquire a first image generated by format conversion of the respective video image. The respective video image is represented by a first color representation. The first image is represented by a second color representation. An image dynamic range supported by the second color representation is wider than an image dynamic range supported by the first color representation. An image dynamic range of the first image is the same as an image dynamic range of the respective video image. The processing circuitry is configured to acquire a second image that is based on the respective video image. The second image is represented by the second color representation. An image dynamic range of the second image is wider than the image dynamic range of the respective video image. The processing circuitry is configured to determine a fusion weight value of each pixel of a plurality of pixels in a target image according to a display order of the respective video image in the original video. The target image is one of the first image and the second image. The processing circuitry is configured to generate a fusion weight map based on the fusion weight value of each pixel of the plurality of pixels in the target image. The processing circuitry is configured to generate a fusion image corresponding to the respective video image based on the target image, a base image, and the fusion weight map. The base image is another one of the first image and the second image. The processing circuitry is configured to generate a fusion video based on the fusion images corresponding to the plurality of video images.

According to another aspect, this disclosure provides an image processing method. The method may be performed by a computer device. In the image processing method, a first image is generated by performing format conversion on an original image. The original image is represented by a first color representation. The first image is represented by a second color representation. An image dynamic range supported by the second color representation is wider than an image dynamic range supported by the first color representation. A second image that is based on the original image is acquired. The second image is represented by the second color representation. An image dynamic range of the second image is wider than an image dynamic range of the original image. A first image area is determined from a source image. The source image is one of the first image and the second image. A second image area is determined from a destination image according to a position of the first image area in the source image. The destination image is another one of the first image and the second image. An original weight value of each pixel of a plurality of pixels in the destination image is smoothed, to obtain target weight values of the plurality of pixels in the destination image. A fusion image corresponding to the original image is generated based on the destination image, the source image, and the target weight values of the plurality of pixels in the destination image.

According to another aspect, this disclosure further provides an image processing apparatus. The apparatus includes processing circuitry configured to generate a first image by performing format conversion on an original image. The original image is represented by a first color representation. The first image is represented by a second color representation. An image dynamic range supported by the second color representation is wider than an image dynamic range supported by the first color representation. The processing circuitry is configured to acquire a second image that is based on the original image. The second image is represented by the second color representation. An image dynamic range of the second image is wider than an image dynamic range of the original image, A first image area is determined from a source image. The source image is one of the first image and the second image. A second image area is determined from a destination image according to a position of the first image area in the source image. The destination image is another one of the first image and the second image. The processing circuitry is configured to smooth an original weight value of each pixel of a plurality of pixels in the destination image, to obtain target weight values of the plurality of pixels in the destination image. The processing circuitry is configured to generate a fusion image corresponding to the original image based on the destination image, the source image, and the target weight values of the plurality of pixels in the destination image.

According to another aspect, this disclosure further provides a computer device. The computer device includes a memory and one or more processors. The memory has computer-readable instructions stored thereon. The computer-readable instructions, when executed by the processor, cause the one or more processors to perform the foregoing image processing method.

According to another aspect, this disclosure further provides one or more non-transitory computer-readable storage media. The computer-readable storage media have computer-readable instructions stored thereon. The computer-readable instructions, when executed by one or more processors, cause the one or more processors to implement the foregoing image processing method.

According to another aspect, this disclosure further provides a computer program product. The computer program product includes computer-readable instructions. The computer-readable instructions, when executed by a processor, implement the foregoing image processing method.

Details of one or more embodiments of this disclosure are provided in the accompanying drawings and descriptions below. Other features, objectives, and advantages of this disclosure become apparent from the specification, the drawings, and the claims.

BRIEF DESCRIPTION OF THE DRAWINGS

To describe the technical solutions in the embodiments of this disclosure more clearly, the following briefly introduces the accompanying drawings for describing the embodiments. The accompanying drawings in the following description show only some embodiments of this disclosure. Other embodiments are within the scope of the present disclosure.

FIG. 2 is a schematic flowchart of an image processing method according to some embodiments.

FIG. 3 is a schematic diagram of format conversion according to some embodiments.

DESCRIPTION OF EMBODIMENTS

To make the objectives, technical solutions, and advantages of this disclosure clearer, the following further describes this disclosure in detail with reference to the accompanying drawings and the embodiments. It is to be understood that the specific embodiments described herein are only used for explaining this disclosure, and are not used for limiting this disclosure.

Figure 1:
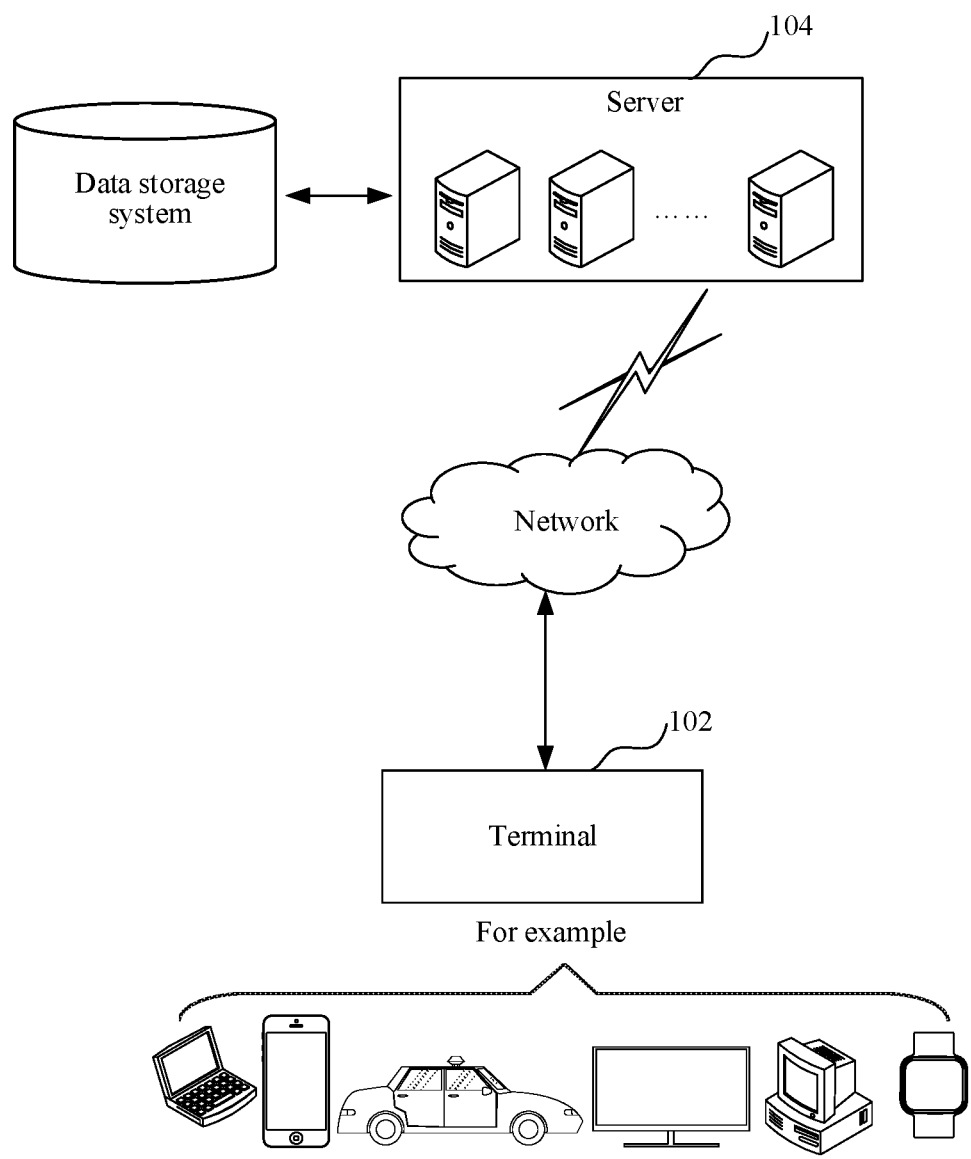
FIG. 1 is a diagram of an application environment of an image processing method according to some embodiments.

An image processing method provided in an embodiment of this disclosure may be applied to an application environment shown in FIG. 1. A terminal 102 communicates with a server 104 by using a network. A data storage system may store data that the server 104 needs to process. The data storage system may be integrated on the server 104, or may be placed on a cloud or another server.

Specifically, the terminal 102 may: for each video image in a plurality of video images of an original video, acquire a first image generated by format conversion of a targeted video image, each video image being represented by a first color representation, the first image being represented by a second color representation, an image dynamic range supported by the second color representation being wider than an image dynamic range supported by the first color representation, and an image dynamic range of the first image being the same as an image dynamic range of the targeted video image; acquire a second image, the second image having consistent image content with the targeted video image and being represented by the second color representation, and an image dynamic range of the second image being wider than the image dynamic range of the targeted video image; use one of the first image or the second image as a target image, and use the other of the first image or the second image as a base image; determine a fusion weight value of each pixel in the target image according to a display order of the targeted video image in the original video, and generate a fusion weight map based on the fusion weight value of each pixel in the target image; fuse the target image and the base image based on the fusion weight map, to generate a fusion image corresponding to the targeted video image; and generate a fusion video based on fusion images respectively corresponding to the plurality of video images. The terminal 102 may store the generated fusion video or send the generated fusion video to another device, for example, to the server 104, and the server 104 may store the fusion video or forward the fusion video to another device.

A process of generating the fusion video may alternatively be performed by a server. For example, the server 104 may: for each video image in a plurality of video images of an original video, acquire a first image corresponding to a targeted video, the first image corresponding to the video image being generated by format conversion of the video image, the video image being represented by a first color representation, the first image being represented by a second color representation, an image dynamic range supported by the second color representation being wider than an image dynamic range supported by the first color representation, and an image dynamic range of the first image being the same as an image dynamic range of the targeted video image; acquire a second image, the second image having consistent image content with the targeted video image and being represented by the second color representation, and an image dynamic range of the second image being wider than the image dynamic range of the targeted video image; use one of the first image or the second image as a target image, and use the other of the first image or the second image as a base image; determine a fusion weight value of each pixel in the target image according to a display order of the targeted video image in the original video, and generate a fusion weight map based on the fusion weight value of each pixel in the target image; fuse the target image and the base image based on the fusion weight map, to generate a fusion image corresponding to the targeted video image; and generate a fusion video based on fusion images respectively corresponding to the plurality of video images. The server 104 may store the generated fusion video or send the generated fusion video to another device, for example, to the terminal 102.

The terminal 102 may be but is not limited to a desktop computer, a notebook computer, a smartphone, a tablet computer, an Internet of Things device, and a portable wearable device. The Internet of Things device may be a smart speaker, a smart TV, a smart air conditioner, a smart vehicle-mounted device, and the like. The portable wearable device may be a smart watch, a smart bracelet, a headset device, and the like. The server 104 may be implemented by using an independent server, or a server cluster including a plurality of servers, or a cloud server. The cloud server may be a cloud server that provides basic cloud computing services such as a cloud service, a cloud database, cloud computing, a cloud function, cloud storage, a network service, cloud communication, a middleware service, a domain name service, a security service, CDN, big data and an artificial intelligence platform.

In some embodiments, as shown in FIG. 2, an image processing method is provided. The method may be performed by a terminal or a server, or may alternatively be performed jointly by a terminal and a server. Taking the method applied to the terminal 102 in FIG. 1 as an example, the method includes the following steps:

Step 202: For each video image in a plurality of video images of an original video, acquire a first image generated by format conversion of a targeted video image, each video image being represented by a first color representation, the first image being represented by a second color representation, an image dynamic range supported by the second color representation being wider than an image dynamic range supported by the first color representation, and an image dynamic range of the first image being the same as an image dynamic range of the targeted video image.

A dynamic range refers to, for example, a span between a maximum brightness and a minimum brightness of a single scenario. An image dynamic range, that is, a dynamic range of an image, refers to a range from a maximum brightness to a minimum brightness in the image. The image dynamic range may reflect a ratio of a maximum brightness to a minimum brightness of a video or an image. There are many types of dynamic ranges, including but not limited to a standard dynamic range (SDR), a high dynamic range (HDR), and a pseudo HDR. A color representation is a way to represent a color of an image, and the color representation is a way to represent a color by using a color space. The first color representation and the second color representation represent a color by using different color spaces, and a color space used by the second color representation is wider than a color space used by the first color representation. For example, the color space used by the first color representation is a part of the color space used by the second color representation, in other words, the color space used by the second color representation includes the color space used by the first color representation. A high dynamic range is wider than a standard dynamic range. Because the color space used by the second color representation includes the color space used by the first color representation, the image dynamic range supported by the second color representation is wider than the image dynamic range supported by the first color representation. The image dynamic range supported by the first color representation refers to the widest dynamic range that an image represented by the first color representation may have. The image dynamic range supported by the second color representation refers to the widest dynamic range that an image represented by the second color representation may have. The image dynamic range supported by the first color representation is a first-type dynamic range, and the image dynamic range supported by the second color representation is a second-type dynamic range. The first-type dynamic range and the second-type dynamic range may be any type of dynamic range. The first-type dynamic range is different from the second-type dynamic range, and the second-type dynamic range is wider than the first-type dynamic range. For example, the first-type dynamic range is a standard dynamic range, and the second-type dynamic range is a high dynamic range. Each image has its own corresponding image dynamic range. An image dynamic range refers to a dynamic range of an image itself, such as a range from a maximum brightness to a minimum brightness of the image. A video image is represented by the first color representation. This means that an image dynamic range of the video image does not exceed a maximum dynamic range that may be represented by the first-type dynamic range.

The original video may be any video, and may be a complete video or a video clip of a complete video. The original video includes multiple frames of images. Multiple frames refer to at least two frames. Each frame of image in the original video is a video image, in other words, the video image is a video frame. Video images in the original video are all represented by the first color representation. The first image is generated by format conversion of a video image. The format conversion refers to converting a color representation. To be specific, the first color representation is converted to the second color representation. When the first-type dynamic range is a standard dynamic range and the second-type dynamic range is a high dynamic range, the format conversion refers to converting an SDR image to an HDR image and keeping an image dynamic range unchanged before and after conversion. Because the image dynamic ranges before and after the format conversion are the same, display effects of the image before and after the format conversion are the same. In other words, the video image has the same display effect as the first image, such as the same color and brightness. A difference lies in a color representation.

Specifically, the first image may be generated by the terminal, or may be generated by the server and acquired by the terminal from the server. When the display effect of the video image in the original video needs to be changed, or a display effect of another image needs to be changed by using the display effect of the video image, the terminal may acquire first images respectively corresponding to the plurality of video images in the original video. The first images corresponding to the video images are generated by format conversion of the video images. A plurality of video images refer to at least two video images. For example, the plurality of video images may be all video images in the original video, or may be some of the video images in the original video.

In some embodiments, taking the first-type dynamic range as a standard dynamic range and the second-type dynamic range as a high dynamic range as an example, as shown in FIG. 3, a schematic diagram of format conversion is provided. An objective of the format conversion is to convert an SDR image to an HDR image. In FIG. 3, $I_{SDR}$ is an SDR image, that is, an image represented by the first color representation, and $I_S$ is an HDR image generated by format conversion of $I_{SDR}$. The steps of the format conversion include: Step 1, normalization: renormalizing a video or an image to a floating-point number between 0 and 1 according to a color bit depth and a level range of the video or image. Step 2, YUV to RGB conversion: converting the video or image to an RGB format according to a method specified by a standard corresponding to a matrix coefficient of the video or image. For example, for a video or an image of a BT.601 standard, refer to a method of the BT.601 standard to convert YUV to RGB. RGB represents three colors: red, green, and blue. Y in YUV represents brightness, U represents color difference information of blue, and V represents color difference information of Red. Step 3, linearization: converting the video or image into a linear light according to a method specified by a standard corresponding to a transmission curve of the video or image. To ensure a consistent display effect after conversion, a display-referred conversion method may be used and a corresponding opto-optical transfer function (OOTF) may be added during a conversion process. For example, a gamma curve of a common BT.709 standard may be converted by using a method specified by a BT.1886 standard. Step 4, color gamut conversion: converting the video or image to a BT.2020 color gamut according to a color gamut of the video or image. For a video or an image having a BT.709 standard color gamut, a method specified by a BT.2087 standard may be used for conversion.

Step 204: Acquire a second image, where the second image has consistent image content with the targeted video image and is represented by the second color representation, and an image dynamic range of the second image is wider than the image dynamic range of the targeted video image.

The first image and the second image have the same definition, that is, the same resolution and size. For example, the sizes of the first image and the second image are both 1280*720 (in pixels). Consistent image content refers to that a foreground and a background in an image are consistent in content, and a position of the foreground in the background is consistent, but display effects may be different. For example, the background is the same grass, and the foreground is a puppy running on the grass. The second image may be generated after format conversion and image enhancement processing of the video image. For example, when the first-type dynamic range is the standard dynamic range and the second-type dynamic range is the high dynamic range, the second image may be generated by HDR conversion of the video image. The second image may also be a native HDR image, for example, the second image may be synthesized by a computer or captured by a camera. For example, the original video is a native SDR video, and the original video has a native HDR video with consistent video content. For example, a produced TV series A has videos in SDR and HDR formats. The original video is the SDR format video of the TV series A, the first image is an image at a certain position in the SDR format video, and a second image is an image at the certain position in the HDR format video of the TV series A. The second image and the video image have consistent content. It may be understood that except for a difference in color, the second image and the video image are consistent. For example, if the video image is an image of a puppy standing on a lawn, then the second image is also an image of a puppy standing on a lawn, and the video image is consistent with the second image except for the difference in color.

The first image is represented by the second color representation. This means that the image dynamic range of the first image does not exceed a maximum dynamic range that may be represented by the second-type dynamic range.

Because the image dynamic range of the second image is wider than that of the video image, and the image dynamic range of the first image is the same as that of the video image, the display effect of the second image is different from that of the first image.

Specifically, the terminal may convert the video image to generate the second image. The conversion may include format conversion and image enhancement processing. The terminal may first perform format conversion on the video image, and then perform image enhancement processing on the image obtained by the format conversion to generate the second image. The image enhancement processing is processing for widening an image dynamic range.

In some embodiments, the terminal may convert the video image to generate the second image based on an inverse tone mapping (iTM) algorithm, for example, convert an SDR image to generate an HDR image. The inverse tone mapping algorithm may be an algorithm or an artificial intelligence (AI) algorithm based on a neural network, such as deep learning.

Step 206: Use one of the first image or the second image as a target image, and use the other of the first image or the second image as a base image.

The target image and the base image are used for fusion to obtain a fusion image corresponding to the video image. A later display order of the video image in the original video indicates a higher similarity between the fusion image corresponding to the video image and the target image. In other words, during a fusion process, a proportion of the fusion image gradually increases during a fusion process, while a proportion of the base image gradually decreases. For example, for a video image of a first frame in the original video, during the fusion process, a proportion of the target image is 0 and a proportion of the base image is 100, then the video image of the first frame is the base image. For a video image of a last frame in the original video, during the fusion process, the proportion of the target image is 100% and the proportion of the base image is 0%, then a fusion image corresponding to the video image of the last frame is the target image. Because display effects of the base image and the target image are different. Therefore, according to the display order of the video images, the fusion images of all video images are arranged to generate a fusion video, and then the fusion video is played. This can show a change process of the display effect gradually changing from the display effect of the base image to the display effect of the target image.

Specifically, the target image is different from the base image. In one case, the terminal may use the first image as the target image and the second image as the base image. In another case, the terminal may use the second image as the target image and the first image as the base image.

Step 208: Determine a fusion weight value of each pixel in the target image according to a display order of the targeted video image in the original video, and generate a fusion weight map based on the fusion weight value of each pixel in the target image.

The fusion weight map is a picture with the same size as the target image. For example, the target image is a 64*64 image, then the fusion weight map is also a 64*64 image. A fusion weight value in an i-th row and a j-th column in the fusion weight map is a fusion weight value of a pixel in an i-th row and a j-th column in the target image. The target image has the same size as the base image. The fusion weight map has the same size as the video image. Data stored in a pixel at each pixel position in the fusion weight map is a fusion weight value corresponding to the pixel position, in other words, a pixel value of the pixel at each pixel position in the fusion weight map is the fusion weight value corresponding to the pixel position. The pixel position refers to a position of the pixel in the image.

The display order refers to an order when arranged according to display time. Each video image in the original video has corresponding display time. When playing the original video, the video images are played in an order of display time from front to back, that is, from early to late. The fusion weight value corresponding to each pixel position in the fusion weight map is determined based on the display order of the video images in the original video. For example, a later display order of the video image in the original video indicates a greater fusion weight value corresponding to each pixel position in the fusion weight map. The fusion weight value corresponding to each pixel position in the fusion weight map may be the same or different.

Specifically, when the display effect of the entire base image needs to be changed, the fusion weight value corresponding to each pixel position in the fusion weight map is the same. The terminal may determine the fusion weight map corresponding to the target image according to the display order of the video images in the original video, and a later display order of the video image in the original video indicates a greater fusion weight value corresponding to each pixel position in the fusion weight map. For example, each frame of image in the original video is a video image, and each video image in the original video has a corresponding frame number. A larger frame number indicates a later display order of the video image in the original video. For each video image in the original video, the terminal may calculate a difference between a frame number of the video image and a frame number of a starting image in the original video to obtain a frame number difference, and determine the fusion weight value corresponding to each pixel position based on the frame number difference. The fusion weight value corresponding to the pixel position is in a positive correlation with the frame number difference. The starting image in the original video refers to a first frame in the display order in the original video, that is, a frame with the smallest frame number in the original video. The terminal may generate the fusion weight map based on the fusion weight value at each pixel position, in other words, the fusion weight value at the pixel position is used as the pixel value at the pixel position to obtain the fusion weight map.

In some embodiments, the terminal may calculate the difference between the frame number of the starting image and a frame number of an end image in the original video, to obtain a total frame number difference. After obtaining the frame number difference and the total frame number difference, the terminal may calculate a ratio of the frame number difference to the total frame number difference, and determine the fusion weight value corresponding to the pixel position based on the calculated ratio. For example, the terminal may use the ratio of the frame number difference to the total frame number difference as the fusion weight value respectively corresponding to each pixel position. Alternatively, the terminal may adjust the ratio of the frame number difference to the total frame number difference, and use an adjustment result as the fusion weight value respectively corresponding to each pixel position. For example, a fusion weight value of a video image with a frame number t in the original video may be expressed as $w=(t-N)/k$, where N is the frame number of the starting image in the original video, and k is the difference between the frame number of the starting image and the frame number of an end frame in the original video, that is, the total frame number difference. The terminal can also adjust the ratio of the frame number difference to the total frame number difference, and use an adjustment result as the fusion weight value respectively corresponding to each pixel position. The adjustment may be to multiply the ratio by a preset weight adjustment value, so that a result of multiplying the preset weight adjustment value by the ratio may be used as the fusion weight value corresponding to the pixel position.

Figure 4:
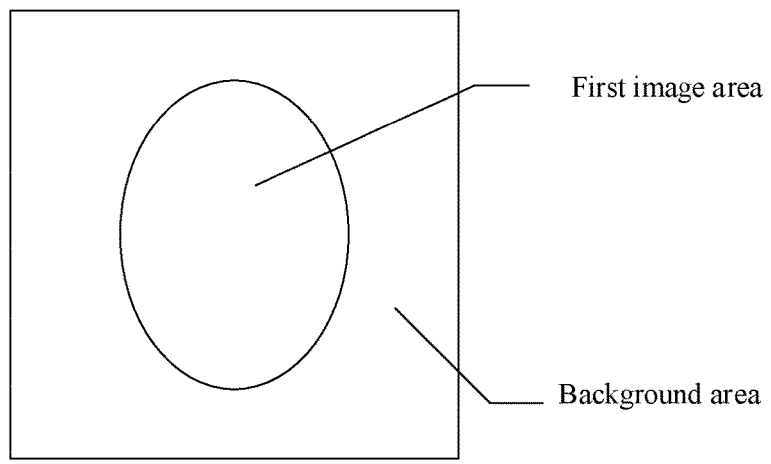
FIG. 4 is a schematic diagram of a fusion area according to some embodiments.

In some embodiments, when a part of the display effect of the target image needs to be fused into the base image, a position of a first image area may be preset, or the terminal may determine the first image area and the position of the first image area from the base image according to a preset area determining manner. The first image area is an area desired to be softly changed into or blended into a target effect. From the perspective of spatial domain fusion, the target effect refers to another effect that is different from a basic effect in the first image area desired to be changed or blended into. The basic effect refers to a main effect of a background area, which is opposite to the target effect. The background area represents an area where an original basic effect is hardly changed, that is, an area in the base image other than the first image area. The spatial domain fusion refers to a scenario where time is ignored and a fusion display effect in a single image is simply considered. As shown in FIG. 4, the first image area and the background area are shown. For a time domain fusion scenario, the basic effect refers to an effect at the beginning in a time domain, and the target effect refers to an effect desired to change or blend into at the end of the time domain relative to the beginning.

In some embodiments, in a case of determining the position of the first image area, the terminal may determine a second image area consistent with the first image area in position from the target image, determine second initial weight value respectively corresponding to each pixel position in the second image area according to the display order of the video images in the original video, and use a first preset value as a second initial weight value corresponding to each pixel position outside the second image area, to obtain the second initial weight value respectively corresponding to each pixel position in the target image. The terminal may generate an initial weight map based on the second initial weight value respectively corresponding to each pixel position, in other words, the second initial weight value at the pixel position is used as the pixel value at the pixel position to obtain the initial weight map. The terminal may use the initial weight map as the fusion weight map of the target image, or the terminal may filter the initial weight map to obtain the filtered weight map. The terminal may use the filtered weight map as the fusion weight map of the target image, or the terminal may adjust each weight value in the filtered weight map and determine a result obtained by adjustment as the fusion weight map of the target image. The first preset value is used for masking a pixel value of a pixel in the target image, so that a display effect of the pixel in the target image does not affect a display effect of the pixel at the corresponding position in the base image. The first preset value is, for example, 0.

In some embodiments, a later display order of the video image in the original video indicates a larger second initial weight value corresponding to the pixel position in the second image area. For example, for each video image in the original video, the terminal may calculate a difference between a frame number of the video image and a frame number of a starting image in the original video, to obtain a frame number difference, and determine the second initial weight value corresponding to the pixel position in the second image area based on the frame number difference. The second initial weight value corresponding to the pixel position is in a positive correlation with the frame number difference. After obtaining the frame number difference, the terminal may calculate a ratio of the frame number difference to the total frame number difference, and determine the second initial weight value corresponding to the pixel position in the second image area based on the calculated ratio. For example, the terminal may use the ratio of the frame number difference to the total frame number difference as the second initial weight value respectively corresponding to each pixel position in the second image area.

In some embodiments, the terminal may perform smoothing filtering on the initial weight map, to obtain the filtered weight map. For example, the terminal may use a two-dimensional Gaussian filtering method to perform smoothing filtering on the initial weight map, to obtain the filtered weight map, and obtain the fusion weight map based on the filtered weight map. The two-dimensional Gaussian filtering method may be represented as $W_F$=GaussianFilter (W, kernel, sigma), where GaussianFilter is a two-dimensional Gaussian filter function, W is an initial weight, kernel and sigma are parameters of the two-dimensional Gaussian filter function, and $W_F$ is the filtered weight map. Different softening effects can be achieved by adjusting the kernel and sigma parameters. Smoothing filtering is performed on the initial weight map to enable weight values in the fusion weight map to smoothly transition in the spatial domain. This ensures that during spatial domain fusion, the target effect can be naturally blended into the basic effect, and the two effects transition softly in the spatial domain, reducing the stiffness of a fusion effect. In this embodiment, determining the initial weight map according to the display order of the video images in the original video improves the smooth transition in the time domain, and performing smoothing filtering on the initial weight map improves the smooth transition in the spatial domain. This improves smooth transitions in the time domain and the spatial domain.

Step 210: Fuse the target image and the base image based on the fusion weight map, to generate a fusion image corresponding to the targeted video image.

Specifically, for each pixel position in the target image, the terminal may fuse the pixel values of the pixel at the pixel position in the target image and the base image by using the fusion weight value corresponding to the pixel position, to obtain a fusion pixel value corresponding to the pixel position, and generate the fusion image based on fusion pixel value respectively corresponding to each pixel position.

In some embodiments, for a target pixel and a base pixel at the same pixel position, the target pixel is a pixel in the target image, and the base pixel is a pixel in the base image. The terminal may obtain the fusion weight value corresponding to the pixel position from the fusion weight map, use the fusion weight value corresponding to the pixel position as a weighted weight of the target pixel, and determine a weighted weight of the base pixel based on the fusion weight value corresponding to the pixel position. For example, the weighted weight of the base pixel is equal to 1 minus the fusion weight value corresponding to the pixel position. The terminal may perform weighted summation on the pixel value of the target pixel and the pixel value of the base pixel by using the weighted weight of the target pixel and the weighted weight of the base pixel, to obtain the fusion pixel value corresponding to the pixel position.

Step 212: Generate a fusion video based on fusion images respectively corresponding to the plurality of video images.

Specifically, when the fusion image respectively corresponding to each video image in the original video is obtained, the terminal may determine a display order of the fusion image respectively corresponding to each video image according to the display order of each video image in the original video, to generate the fusion video. A display order of the fusion images corresponding to the video images in the fusion video is the same as the display order of the video images in the original video. The terminal may arrange the fusion images respectively corresponding to the video images according to the display order of the video images, to generate the fusion video.

In some embodiments, the preset area determining manner includes determining the first image area according to a display order of images in a video. A process of determining the first image area according to a display order of images in a video is as follows: The terminal may determine the first image area in the base image according to the display order of the video images in the original video. For example, the terminal may divide the base image by using a vertical division line. A later display order of the video image in the original video indicates that the vertical division line is further to the right of the base image, and the terminal may determine an image area to the left of the vertical division line in the base image as the first image area. The terminal may determine the second image area from the target image according to a position of the first image area in the base image, and the position of the first image area in the base image is consistent with a position of the second image area in the target image. The terminal may use a second preset value as the second initial weight value corresponding to each pixel in the second image area, and determine the first preset value as the second initial weight value of each pixel outside the second image area. The terminal performs filtering processing on the weight map including the initial weight value of each pixel, to obtain the fusion weight map including the fusion weight value respectively corresponding to each pixel. The terminal may fuse the target image into the base image to generate the fusion image corresponding to the video image based on the fusion weight value respectively corresponding to each pixel in the target image recorded in the fusion weight map, and generate the fusion video based on the fusion image respectively corresponding to each video image in the original video. The second preset value is used for retaining the pixel value of the pixel in the target image, so that the display effect of the pixel changes the display effect of the pixel at the corresponding position in the base image. The second preset value may be, for example, 1. Because a later display order of the video image in the original video indicates that the vertical division line is further to the right of the base image, during playing the fusion video, a transition process of the display effect may be observed. This improves smoothness of the fusion. The method of this embodiment is applied in a scenario of dynamic range switching, and smoothness during dynamic switching may be improved.

Figure 5:
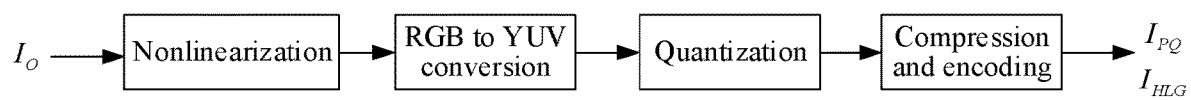
FIG. 5 is a schematic diagram of encoding according to some embodiments.

In some embodiments, when the fusion video or fusion image is obtained, the terminal may encode the fusion image to obtain an encoded image corresponding to the fusion image, and the terminal may send the encoded image to another device or display the encoded image. For example, the terminal may combine encoded images corresponding to the fusion images in the fusion video into an encoded video, and send the encoded video to another device. FIG. 5 is a schematic diagram of encoding a fusion image. In FIG. 5, $I_O$ represents a fusion image, $I_{PQ}$ and $I_{HLG}$ both represent an encoded image. In a nonlinearization stage, according to SMPTE ST 2084 and ARIB STD B67 standards, linear light is converted into nonlinear light, and images encoded by a perceptual quantizer (PQ) curve and a hybrid log-gamma (HLG) curve are respectively output. When the PQ curve is used in the nonlinearization stage, the encoded image obtained is $I_{PQ}$. When the HLG curve is used in the nonlinearization stage, the encoded image obtained is $I_{HLG}$. In an RGB to YUV conversion stage, a BT.2020 NCL manner is used for conversion. In a quantization stage, YUV is quantized into a fixed point number according to a desired output color bit depth and level range. In a compression and encoding stage, H.265 or another video encoder may be used as needed to compress and encode an image, and output an HDR10 or HLG bitstream for further distribution or display.

In the foregoing image processing method, because the image dynamic range of the first image is the same as the image dynamic range of the targeted video image, and the image dynamic range of the second image is wider than the image dynamic range of the targeted video image, the image dynamic range of the second image is wider than the image dynamic range of the first image, and display effects of the first image and the second image are different. Because one of the first image or the second image is used as the target image, and the other of the first image or the second image is used as the base image, display effects of the base image and the target image are different. Moreover, determining a fusion weight map corresponding to the target image according to a display order of video images in an original video enables the fusion weight map to be automatically updated with the display order. Thus, based on the fusion weight value respectively corresponding to each pixel in the target image recorded in the fusion weight map, the target image is fused into the base image to generate a fusion image corresponding to the video image, and a fusion video is generated based on the fusion image respectively corresponding to each video image in the original video. A display effect from the target image fused into the fusion image in the fusion video may change with the display order, so that the display effect may be smoothly transitioned when playing the fusion video, improving display effects of an image and a video. In addition, because in this disclosure, the display effect is changed in a manner of image fusion instead of directly changing the display effect of the image, complexity is low and hardware resources used in an image processing process are reduced.

In some embodiments, the determining a fusion weight value of each pixel in the target image according to a display order of the targeted video image in the original video includes: determining a quantity of video images between a starting image in the original video and the targeted video image, to obtain a first quantity; determining the fusion weight value of each pixel in the target image according to the first quantity, the fusion weight value of the pixel being in a positive correlation with the first quantity; and generating a fusion weight map corresponding to the target image based on the fusion weight value of each pixel in the target image.

The starting image in the original video refers to a first frame of image in the display order in the original video. The first quantity is the foregoing frame number difference. The frame number difference may also be understood as an order difference. The order difference refers to a difference between the display order of the video image and the display order of the starting image. For example, the display order of the video image is 3, and the display order of the starting image is 1, then the order difference is 3−1=2. The fusion weight value is in a positive correlation with the order difference. A positive correlation refers to that: when other conditions remain unchanged, two variables change in the same direction, and when one variable changes from large to small, the other variable also changes from large to small.

Specifically, a terminal may calculate a difference between a frame number of the starting image and a frame number of an end image in the original video as a total frame number difference. Each video image in the original video may have a corresponding frame number. The frame number of the video image in the original video is determined according to the display order. A later display order indicates a greater frame number. The frame numbers of the video images in the original video are consecutive positive integers. For each video image, the terminal may calculate a difference between a frame number of the video image and the frame number of the starting image in the original video, to obtain a frame number difference. When a display effect of the entire base image needs to be changed, the terminal may calculate a ratio of the frame number difference to the total frame number difference, and determine a fusion weight value corresponding to each pixel position based on the calculated ratio. For example, the terminal may determine the ratio of the frame number difference to the total frame number difference as the fusion weight value corresponding to each pixel position, or the terminal may adjust the ratio of the frame number difference to the total frame number difference, and use an adjustment result as the fusion weight value respectively corresponding to each pixel position. The starting image in the original video refers to a first frame in the display order in the original video, that is, a frame with the smallest frame number in the original video. The terminal may generate the fusion weight map based on the fusion weight value respectively corresponding to each pixel in the target image.

In some embodiments, when a part of the display effect of the target image needs to be fused into the base image, the terminal may determine a position of a first image area from the base image according to a preset area determining manner, and determine a second image area from the target image based on the position of the first image area. The terminal may determine a second initial weight value respectively corresponding to each pixel position in the second image area according to the display order of the video images in the original video, and use a first preset value as a second initial weight value corresponding to each pixel position outside the second image area in the target image, to obtain the second initial weight value respectively corresponding to each pixel position in the target image. The terminal may generate an initial weight map based on the second initial weight value respectively corresponding to each pixel position, in other words, the second initial weight value at the pixel position is used as the pixel value at the pixel position to obtain the initial weight map. The terminal may use the initial weight map as the fusion weight map of the target image, or the terminal may filter the initial weight map to obtain the filtered weight map. The terminal may use the filtered weight map as the fusion weight map of the target image, or the terminal may adjust each weight value in the filtered weight map and determine a result obtained by adjustment as the fusion weight map of the target image.

In this embodiment, the fusion weight value respectively corresponding to each pixel in the target image is determined according to the first quantity. Because the fusion weight value is in a positive correlation with the first quantity, a later display order indicates a greater fusion weight value, so that the generated fusion video may present a dynamic process of smoothly switching from one type of dynamic range display effect to another type of dynamic range display effect during playing. This improves smoothness of the video during dynamic range switching.

In some embodiments, the determining the fusion weight value of each pixel in the target image according to the first quantity includes: determining a quantity of video images between the starting image and an end image in the original video, to obtain a second quantity; and determining the fusion weight value of each pixel in the target image according to a relative relationship between the first quantity and the second quantity.

Specifically, a terminal may calculate a difference between a frame number of a starting image and a frame number of an end image in the original video as a total frame number difference. The second quantity is the total frame number difference.

In some embodiments, the relative relationship between the first quantity and the second quantity may be a ratio relationship. The terminal may calculate a ratio of the first quantity to the second quantity, and determine the fusion weight value of each pixel in the target image based on the ratio.

In this embodiment, the fusion weight value of each pixel in the target image is determined according to the relative relationship between the first quantity and the second quantity, so that the generated fusion video may present a dynamic process of smoothly switching from one type of dynamic range display effect to another type of dynamic range display effect during playing. This improves smoothness of the video during dynamic range switching.

In some embodiments, the determining the fusion weight value of each pixel in the target image according to a relative relationship between the first quantity and the second quantity includes: obtaining a first initial weight value of each pixel in the target image according to the ratio of the first quantity to the second quantity; and adjusting the first initial weight value of each pixel in the target image by using a preset weight adjustment value, to obtain the fusion weight value of each pixel in the target image.

The preset weight adjustment value is a preset value that may be preset as needed or may be manually adjusted by a user. A value range of the preset weight adjustment value is [0, 1], which may be used for controlling a proportion of a target effect of a fusion area in a spatial domain fusion scenario or an end frame in a time domain fusion scenario after final fusion.

Specifically, when the display effect of the entire base image needs to be changed, the terminal may calculate the ratio of the first quantity to the second quantity, determine the calculated ratio as the first initial weight value corresponding to each pixel in the target image, multiply the first initial weight value by the preset weight adjustment value, and determine a multiplication result as the fusion weight value respectively corresponding to each pixel in the target image.

In this embodiment, the first initial weight value respectively corresponding to each pixel in the target image is adjusted by using the preset weight adjustment value, and the fusion weight value respectively corresponding to each pixel in the target image is determined, so that a fusion effect may be adjusted by using the preset weight adjustment value, improving fusion flexibility.

In some embodiments, the adjusting the first initial weight value of each pixel in the target image by using a preset weight adjustment value, to obtain the fusion weight value of each pixel in the target image includes: for each pixel in the target image, multiplying the first initial weight value of the pixel by the preset weight adjustment value, and determining a multiplication result as the fusion weight value of the pixel.

In this embodiment, the first initial weight value of the pixel is multiplied by the preset weight adjustment value, and the multiplication result is determined as the fusion weight value of the pixel, so that the fusion weight value can be flexibly adjusted according to the preset weight adjustment value, and adjustment of the display effect is thus more flexible.

In some embodiments, the determining the fusion weight value of each pixel in the target image according to the first quantity includes: determining a first image area from the base image according to a preset area determining manner; determining a second image area from the target image according to a position of the first image area in the base image; determining a quantity of video images between the starting image and an end image in the original video, to obtain a second quantity; determining a second initial weight value of each pixel in the second image area according to a ratio of the first quantity to the second quantity; determining a first preset value as a second initial weight value of each pixel outside the second image area in the target image; and determining the fusion weight value of each pixel in the target image based on the second initial weight value of each pixel in the target image.

The first image area refers to an area in the base image to be changed into a target effect or blended into a target effect.

Specifically, the first image area may be specified, or may be determined from the base image by using the preset area determining manner. The preset area determining manner includes detecting the base image to determine an image area. For example, when the original video includes a target object, if a display effect of the target object in the original video needs to be changed, an image area occupied by the target object may be detected from a video image, and the image area occupied by the target object may be determined as the first image area. The target object may be a living person or animal, or an inanimate object, or a part of a person, animal, or inanimate object, for example, a human face. For example, for a scenario where human faces are of interest, a face detection algorithm may be used to detect and output face position information in a video picture, and an image area indicated by the face position information is determined as the first image area.

In some embodiments, the terminal may calculate the ratio of the first quantity to the second quantity, determine the calculated ratio as the second initial weight value of each pixel in the second image area, and determine the first preset value as the second initial weight value of each pixel outside the second image area in the target image.

In some embodiments, for each pixel in the target image, the terminal may use the second initial weight value corresponding to the pixel as the fusion weight value corresponding to the pixel, or the terminal may smooth the second initial weight value respectively corresponding to each pixel in the target image, to obtain the fusion weight value corresponding to each pixel in the target image.

In this embodiment, a second initial weight value of a pixel at a position of a fusion area in the target image is determined based on the ratio of the first quantity to the second quantity, so that smooth fusion in a time domain can be achieved. The first preset value is determined as the second initial weight value of each pixel outside the second image area in the target image, so that smooth fusion in a spatial domain can be achieved, smoothness of the fusion is improved, and display effects of the image and video are improved.

In some embodiments, the determining the fusion weight value of each pixel in the target image based on the second initial weight value of each pixel in the target image includes: smoothing the second initial weight value of each pixel in the target image, to obtain the fusion weight value of each pixel in the target image.

The smoothing is processing for reducing a difference between second initial weight values of adjacent pixels, so that smooth transition between the second initial weight values is achieved. The smoothing may be implemented by using a filtering method. The filtering method includes but is not limited to bilateral filtering or mean filtering.

Specifically, the terminal may generate an initial weight map based on the second initial weight value respectively corresponding to each pixel position, in other words, the second initial weight value at the pixel position is used as the pixel value at the pixel position to obtain the initial weight map. The terminal may filter the initial weight map to obtain the filtered weight map. The terminal may use the filtered weight map as the fusion weight map of the target image, or the terminal may adjust each weight value in the filtered weight map and determine a result obtained by adjustment as the fusion weight map of the target image.

In some embodiments, the terminal may use the preset weight adjustment value to adjust each weight value in the filtered weight map, to obtain the fusion weight map. Specifically, for a weight value at each pixel position in the filtered weight map, the terminal may multiply the weight value at the pixel position by the preset weight adjustment value, to obtain a fusion weight value at the pixel position, and form the fusion weight map by using the fusion weight values at all pixel positions. A pixel value of a pixel at a certain pixel position in the fusion weight map is a fusion weight value corresponding to a pixel at the same pixel position in the target image.

In this embodiment, the second initial weight value corresponding to each pixel in the target image is smoothed, and the fusion weight value respectively corresponding to each pixel in the target image is determined. This improves smoothness of spatial domain fusion and improves display effects of the image and video.

In some embodiments, the acquiring a second image includes: performing image enhancement processing on the first image to obtain the second image, the image enhancement processing being image processing that widens an image dynamic range.

The image enhancement processing is processing for widening an image dynamic range of an image. The image enhancement processing may be implemented by changing a color and brightness of an image. The image enhancement processing may alternatively be implemented by using an image enhancement model. The image enhancement model is configured to transform an image represented by a first color representation into an image represented by a second color representation. The image enhancement model is a neural network model, and the second image can be obtained by inputting the first image into the image enhancement model.

Specifically, the terminal may perform format conversion on the video image, to obtain a first image that is consistent with the video image in image content and is represented by the second color representation. The terminal may perform image enhancement processing on the first image to expand an image dynamic range of the image, to obtain a second image with an image dynamic range wider than that of the video image.

In some embodiments, a first-type dynamic range is a standard dynamic range, a second-type dynamic range is a high dynamic range, the base image is the second image, the target image is the first image, and a step of obtaining the second image includes: performing format conversion on the video image to obtain the first image; and performing image enhancement processing on the first image to obtain the second image. Because a current up-conversion algorithm for SDR to HDR conversion still faces a problem of poor conversion effect or uncoordinated style in a specific area when applied in industry, in this embodiment, the base image is the second image and the target image is the first image, a specific adjustment to up-converted HDR picture content, especially specific protection of local content that is sensitive to human eyes or has strong prior experience, can significantly improve picture quality and robustness of up-converted HDR. Up-converted HDR refers to an HDR image generated by converting an SDR image.

In this embodiment, image enhancement processing is performed on the first image to obtain the second image. Therefore, when there is no native second image, the second image can be generated by using the method provided in this embodiment. This expands the applicability of the image processing method provided in this disclosure.

In some embodiments, the fusing the target image and the base image based on the fusion weight map, to generate a fusion image corresponding to the targeted video image includes: for each pixel position in the target image, determining a pixel at a targeted pixel position in the base image; determining a fusion weight value of the pixel at the targeted pixel position in the base image according to a fusion weight value of a pixel at the targeted pixel position in the target image; using the fusion weight values of the pixel at the targeted pixel position in the target image and in the base image to fuse a pixel value of the pixel at the targeted pixel position in the target image to a pixel value of the pixel at the targeted pixel position in the base image, to obtain a fusion pixel value at the targeted pixel position; and generating a fusion image corresponding to the targeted video image based on a fusion pixel value at each pixel position in the target image.

Pixels in the target image may be referred to as target pixels, and pixels in the base image may be referred to as base pixels. A fusion weight value of a base pixel at a pixel position is in a negative correlation with a fusion weight value of a target pixel at the pixel position. A negative correlation refers to: when other conditions remain unchanged, two variables change in an opposite direction, and when one variable changes from large to small, the other variable changes from small to large.

Specifically, for each pixel position in the target image, the terminal may obtain the pixel value of the pixel at the pixel position from the fusion weight map, to obtain the fusion weight value of the target pixel at the pixel position. The terminal determines the fusion weight value of the base pixel at the pixel position based on the fusion weight value of the target pixel at the pixel position. For example, the fusion weight value of the base pixel at the pixel position is: 1 minus the fusion weight value of the target pixel at the pixel position.

In some embodiments, the terminal may perform a weighted summation operation on the pixel values respectively corresponding to the target pixel and the base pixel by using the fusion weight values respectively corresponding to the target pixel and the base pixel, and determine a result of the operation as a fusion pixel value at the pixel position, to obtain a fusion image. For example, a formula $I_O=(1-W_F*f)*I_B+W_F*f*I_F$ may be used to obtain a fusion image $I_O$, where $I_O$ is a fusion image, $W_F*f$ is a fusion weight map including the fusion weight value corresponding to the target pixel obtained after adjustment by f, $I_B$ is a base image, $I_F$ is a target image, $W_F$ is a weight map before adjustment by f, and f is a preset weight adjustment value.

In some embodiments, determination of the base image and the target image may be controlled by a parameter. For example, the base image and the target image may be determined by using a parameter s. The parameter s is a parameter that can be manually set by a user and has a value of 0 or 1. When s is 0, a basic effect is an image effect of the second-type dynamic range, and a target effect is an image effect of the first-type dynamic range. For a spatial domain fusion scenario, a background area is the image effect of the second-type dynamic range, and the image effect of the first-type dynamic range is blended into the first image area. For a time domain fusion scenario, during playing from the starting image to the end image, the image effect of the second-type dynamic range gradually transitions to the image effect of the first-type dynamic range. When s is 1, the basic effect is an image effect of the first-type dynamic range, and the target effect is an image effect of the second-type dynamic range. For a spatial domain fusion scenario, a background area is the image effect of the first-type dynamic range, and the image effect of the second-type dynamic range is blended into a fusion area. For a time domain fusion scenario, during the playing from the starting image to the end image, the image effect of the first-type dynamic range gradually transitions to the image effect of the second-type dynamic range. Thus, when s is 0, the first image is used as the target image and the second image is used as the base image. When s is 1, the first image is used as the base image and the second image is used as the target image. Taking the first-type dynamic range as SDR and the second-type dynamic range as HDR as an example, when s is 0, then $I_F=I_S$ and $I_B=I_{HDR}$, and when s is 1, $I_F=I_{HDR}$, $I_B=I_S$, where $I_S$ is a first image, and $I_{HDR}$ is a second image.

In this embodiment, the fusion weight values respectively corresponding to the target pixel and the base pixel are used to fuse the pixel values respectively corresponding to the target pixel and the base pixel, to obtain the fusion pixel value at the pixel position. The fusion image corresponding to the video image is generated based on the fusion pixel value of each pixel position, so that the images are fused according to the fusion weight value determined by a display order. This enables smooth transition of image fusion in the time domain and improves display effects of the image and video.

In some embodiments, the method further includes:
playing a first video, the first video being represented by the first color representation; receiving a video switching instruction; determining, in response to the video switching instruction, a transition period from responding to the video switching instruction to switching to a second video, and extracting a video clip of the transition period from the first video, to obtain the original video, the second video having consistent content with the first video and being represented by the second color representation; switching from playing the first video to playing the fusion video, at the beginning of the transition period; and switching to playing the second video after the transition period ends.

During playing a video, the video usually needs to be switched. For example, the video is played from both a first video source and a second video source. The first video source is used for providing the first video, and each image in the first video is represented by the first color representation, for example, the first video is an SDR video. The second video source is used for providing the second video, and each image in the second video is represented by the second color representation. A video source may be uniquely identified by an address where a video is downloaded. The second video having consistent content with the first video may be understood as: Except for differences in a color and brightness, a video image of an i-th frame in the first video and a video image of an i-th frame in the second video are the same.

The first video source is an address for downloading the first video, and the second video source is an address for downloading the second video. The first video has same content as the second video. For example, when a certain TV series is played and the first video is downloaded from the first video source and played, when receiving the video switching instruction, a terminal switches to playing the second video downloaded from the second video source.

In order to improve smooth transition between dynamic ranges during a switching process, the terminal may determine a transition period, which is used for presenting a process of switching from the first video to the second video. The video switching instruction is used for triggering switching from playing the first video to playing the second video.

Specifically, when the first video is played, in response to the video switching instruction, a video clip of the transition period is determined from unplayed video data of the first video. For example, the terminal may determine a frame number of a video image played at a current moment, obtain a current frame number, determine a video image having a greater difference between the frame number and the current frame number than a difference threshold from the unplayed video data, and determine display time of the determined video image as starting time of the transition period. The difference threshold may be set as needed, for example, may be 100 or 60. A video clip within a preset duration from the starting time is determined as the video clip of the transition period, and a duration of the transition period is the preset duration. The preset duration may be set as needed, for example, may be 5 s or 10 s, or the like.

In some embodiments, the terminal may determine the video clip in the transition period as the original video, and perform a process of generating a fusion video based on the original video. Specifically, the terminal may acquire the first image generated by format conversion of a video image in the video clip, and acquire the second image that is consistent with the video image in image content and is represented by the second color representation. The terminal may determine a fusion weight map corresponding to the target image according to a display order of video images in the video clip. The target image is one of the first image or the second image. The terminal may fuse the target image into the base image based on the fusion weight map, to obtain a fusion image corresponding to the video image. The base image is one of the first image or the second image and different from the target image. The terminal may form a fusion video by using the fusion images respectively corresponding to the video images in the video clip. Because the first video has the same content as the second video, an only difference is that different color representations are used, the terminal may determine a video image with the same frame number or the same display time from the second video according to the frame number or display time of the video image as the second image corresponding to the video image.

In some embodiments, in response to the video switching instruction, the terminal continues to play the first video before playing to the transition period, plays the fusion video in the transition period when entering the transition period, and switches to playing the second video after the transition period ends. This implements a transitional dynamic range switching process, improves smoothness of the video during the switching process, and improves a playing effect of the video.

In this embodiment, the first video is played, the video switching instruction is received, in response to the video switching instruction, the transition period from responding to the video switching instruction to switching to the second video is determined, the video clip of the transition period is extracted from the first video, and the original video is obtained. At the beginning of the transition period, playing the first video is switched to playing the fusion video, and after the transition period ends, the second video is switched to be played. This implements a transitional video switching process, improves smoothness of the video during the switching process, and improves a playing effect of the video. This embodiment may be used in a fusion scenario of HDR and SDR videos or images. Local areas or the entire image may be fused according to needs of an application scenario, to achieve smooth transition, switching, synchronized contrast playback, and presentation of HDR and SDR effects in a spatial domain or time domain. When different formats of a same video are switched on a device that supports HDR, a user can see a dynamic process of a video effect smoothly switching from SDR to HDR, or from HDR to SDR.

In some embodiments, the switching to playing the second video after the transition period ends includes: switching to playing the second video after the playing the fusion video ends.

The switching to playing the second video refers to that the second video is switched to be played.

In this embodiment, after the fusion video is played, the second video is switched to be played, so that the second video may be switched naturally and the display effect is improved.

Figure 6:
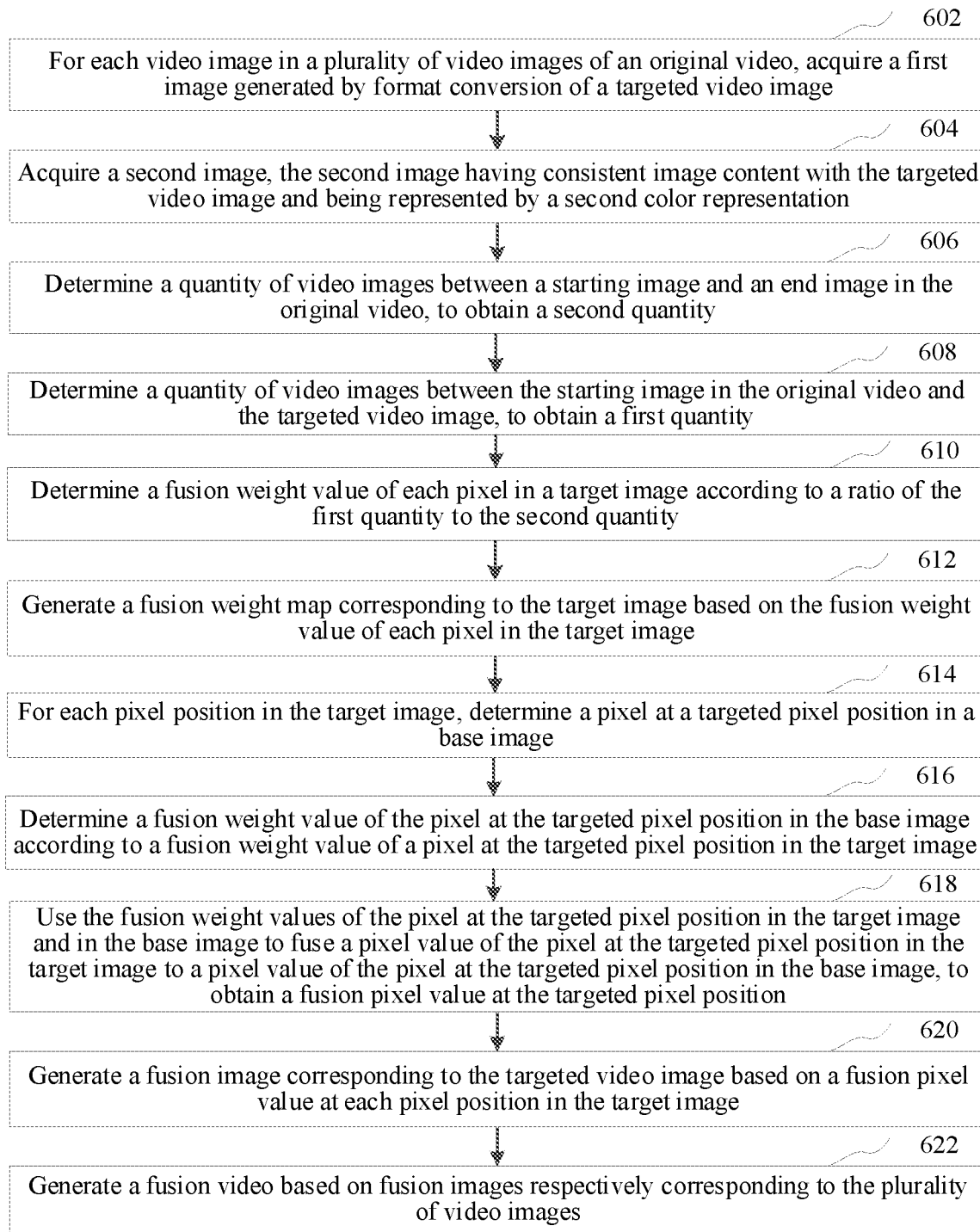
FIG. 6 is a schematic flowchart of an image processing method according to some embodiments.

In some embodiments, as shown in FIG. 6, an image processing method is provided. The method may be performed by a terminal or a server, or may also be performed jointly by the terminal and the server. Taking the method applied to the terminal as an example, the method includes the following steps:

Step 602: For each video image in a plurality of video images of an original video, acquire a first image generated by format conversion of a targeted video image.

Step 604: Acquire a second image, the second image having consistent image content with the targeted video image and being represented by a second color representation.

Step 606: Determine a quantity of video images between a starting image and an end image in the original video, to obtain a second quantity.

Step 608: Determine a quantity of video images between the starting image in the original video and the targeted video image, to obtain a first quantity.

Step 610: Determine a fusion weight value of each pixel in a target image according to a ratio of the first quantity to the second quantity.

Step 612: Generate a fusion weight map corresponding to the target image based on the fusion weight value of each pixel in the target image.

Step 614: For each pixel position in the target image, determine a pixel at a targeted pixel position in a base image.

A target pixel refers to a pixel in the target image, and a base pixel refers to a pixel in the base image.

Step 616: Determine a fusion weight value of the pixel at a targeted pixel position in the base image according to a fusion weight value of a pixel at the targeted pixel position in the target image.

Step 618: Use the fusion weight values of the pixel at the targeted pixel position in the target image and in the base image to fuse a pixel value of the pixel at the targeted pixel position in the target image to a pixel value of the pixel at the targeted pixel position in the base image, to obtain a fusion pixel value at the targeted pixel position.

Step 620: Generate a fusion image corresponding to the targeted video image based on a fusion pixel value at each pixel position in the target image.

Specifically, the terminal may arrange each fusion pixel value according to the pixel position, to generate a fusion image corresponding to the video image.

Step 622: Generate a fusion video based on fusion images respectively corresponding to the plurality of video images.

Specifically, the terminal may determine a video including the fusion images respectively corresponding to the video images as the fusion video.

In this embodiment, a new method for image fusion is implemented, because an image dynamic range of the first image is the same as an image dynamic range of the targeted video image, and an image dynamic range of the second image is wider than the image dynamic range of the targeted video image, the image dynamic range of the second image is wider than the image dynamic range of the first image, and display effects of the first image and the second image are different. Because one of the first image or the second image is used as the target image, and the other of the first image or the second image is used as the base image, display effects of the base image and the target image are different. Determining a fusion weight map corresponding to the target image according to a display order of video images in an original video enables the fusion weight map to be automatically updated with the display order. Thus, based on the fusion weight value respectively corresponding to each pixel in the target image recorded in the fusion weight map, the target image is fused into the base image to generate a fusion image corresponding to the video image, and a fusion video is generated based on the fusion image respectively corresponding to each video image in the original video. A display effect from the target image fused into the fusion image in the fusion video may change with the display order, so that the display effect may be smoothly transitioned when playing the fusion video, and display effects of an image and a video are improved.

Figure 7:
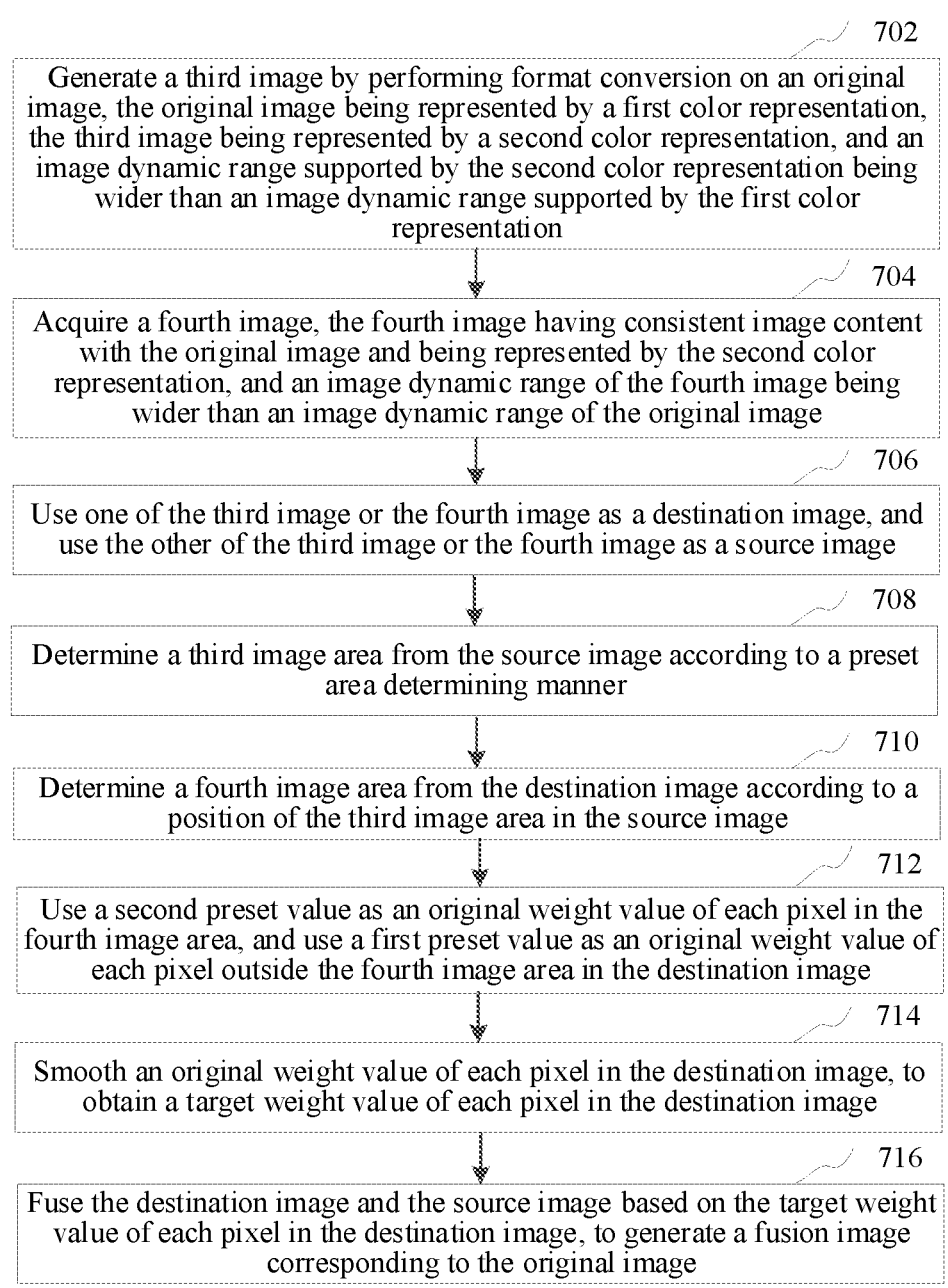
FIG. 7 is a schematic flowchart of an image processing method according to some embodiments.

In some embodiments, as shown in FIG. 7, an image processing method is provided. The method may be performed by a terminal or a server, or may alternatively be performed jointly by a terminal and a server. Taking the method applied to the terminal as an example, the method includes:

Step 702: Generate a third image by performing format conversion on an original image, the original image being represented by a first color representation, the third image being represented by a second color representation, and an image dynamic range supported by the second color representation being wider than an image dynamic range supported by the first color representation.

Step 704: Acquire a fourth image, the fourth image having consistent image content with the original image and being represented by the second color representation, and an image dynamic range of the fourth image being wider than an image dynamic range of the original image.

Step 706: Use one of the third image or the fourth image as a destination image, and use the other of the third image or the fourth image as a source image.

Step 708: Determine a third image area from the source image according to a preset area determining manner.

Step 710: Determine a fourth image area from the destination image according to a position of the third image area in the source image.

Step 712: Use a second preset value as an original weight value of each pixel in the fourth image area, and use a first preset value as an original weight value of each pixel outside the fourth image area in the destination image.

Step 714: Smooth an original weight value of each pixel in the destination image, to obtain a target weight value of each pixel in the destination image.

Step 716: Fuse the destination image and the source image based on the target weight value of each pixel in the destination image, to generate a fusion image corresponding to the original image.

The original image may be a native image or a computer-generated image. The fourth image may be a native image, or an image generated by converting the original image. The second preset value is 1, and the first preset value is 0. For a manner of determining the third image area from the source image according to the preset area determining manner, reference may be made to a manner of determining a first image area from a base image. For a manner of determining the fourth image area from the destination image, reference may be made to a manner of determining a second image area from a target image.

The source image is an image in the third image and the fourth image where a display effect needs to be blended or changed, and the destination image is an image in the third image and the fourth image that is used for blending into or changing a display effect of the source image. The source image is one of the third image or the fourth image and is different from the destination image. For example, the destination image is the third image and the source image is the fourth image, or the destination image is the fourth image and the source image is the third image. In other words, a concept of the source image is equivalent to that of the foregoing base image, and a concept of the destination image is equivalent to that of the foregoing target image.

Specifically, the terminal may smooth the original weight value of each pixel, to obtain the target weight value respectively corresponding to each pixel in the destination image. For example, the terminal may form an original weight map by using the original weight value of each pixel. A pixel value of a pixel at a pixel position in the original weight map is an original weight value of a pixel at the pixel position in the destination image. The terminal may perform smoothing filtering on the original weight map, to obtain a target weight map. The target weight map includes the target weight value respectively corresponding to each pixel in the destination image. A pixel value of a pixel at a pixel position in the target weight map is a target weight value of a pixel at the pixel position in the destination image.

In some embodiments, pixels in the destination image may be referred to as destination pixels. Pixels in the source image may be referred to as source pixels. For the destination pixel and the source pixel at the same pixel position in the destination image and the source image, the terminal may obtain a target weight value corresponding to the pixel position from the target weight map, use the target weight value corresponding to the pixel position as a weighted weight of the destination pixel, and determine a weighted weight of the source pixel at the pixel position based on the destination weight value corresponding to the pixel position. For example, the weighted weight of the source pixel at the pixel position is in a negative correlation with the destination weight value corresponding to the pixel position, for example, the weighted weight of the source pixel at the pixel position is equal to 1 minus the destination weight value corresponding to the pixel position. The weighted weights corresponding to the destination pixel and the source pixel are used for performing weighted summation on the pixel value of the destination pixel and the pixel value of the source pixel, to obtain the fusion pixel value corresponding to the pixel position. The fusion image corresponding to the original image is generated based on the fusion pixel value respectively corresponding to each pixel position.

In some embodiments, when the fusion image is obtained, the terminal may encode the fusion image to obtain an encoded image corresponding to the fusion image, and the terminal may send the encoded image to another device or display the encoded image.

In the foregoing image processing method, because the original image is represented by the first color representation, the third image is represented by the second color representation, the fourth image has consistent image content with the original image and is represented by the second color representation, the image dynamic range of the fourth image is wider than the image dynamic range of the original image, and the image dynamic range supported by the second color representation is wider than the image dynamic range supported by the first color representation, display effects of the source image and the destination image are different. The destination image is fused into the source image by using the target weight value, and the display effect of the destination image may be fused into the source image. Because the target weight value is obtained by smoothing the original weight value of each pixel, the destination image is fused into the source image by using the target weight value, to generate the fusion image corresponding to the original image. This improves a smooth transition between different display effects in the fusion image and improves the display effect of the image. In addition, because in this disclosure, the display effect is changed in a manner of image fusion instead of directly changing the display effect of the image, complexity is low and hardware resources used in an image processing process are reduced.

In some embodiments, the method further includes a step of obtaining the fourth image, and the step of obtaining the fourth image includes: performing image enhancement processing on the third image to obtain the fourth image, the image enhancement processing being image processing that widens an image dynamic range.

Specifically, the terminal may perform image enhancement processing on the third image to obtain the fourth image. The image enhancement processing is image processing for widening an image dynamic range of an image.

In this embodiment, the image enhancement processing is performed on the third image to obtain the fourth image. Therefore, when there is no native fourth image, the fourth image can be generated by using the method provided in this embodiment. This expands the applicability of the image processing method provided in this disclosure.

In some embodiments, the smoothing an original weight value of each pixel in the destination image, to obtain a target weight value of each pixel in the destination image includes: smoothing the original weight value of each pixel, to obtain a smoothed weight value of each pixel in the destination image; and adjusting the smoothed weight value of each pixel in the destination image by using a preset weight adjustment value, to obtain the target weight value of each pixel in the destination image.

The preset weight adjustment value is a preset value that may be preset as needed or may be manually adjusted by a user. A value range of the preset weight adjustment value is [0, 1], which may be used for controlling a proportion of a target effect of a fusion area in a spatial domain fusion scenario or an end frame in a time domain fusion scenario after final fusion. The smoothed weight value is a weight value obtained after smoothing, for example, a weight value obtained by filtering.

Specifically, the terminal may multiply the smoothed weight value by the preset weight adjustment value, and determine a multiplication result as the target weight value respectively corresponding to each pixel in the destination image.

Figure 8:
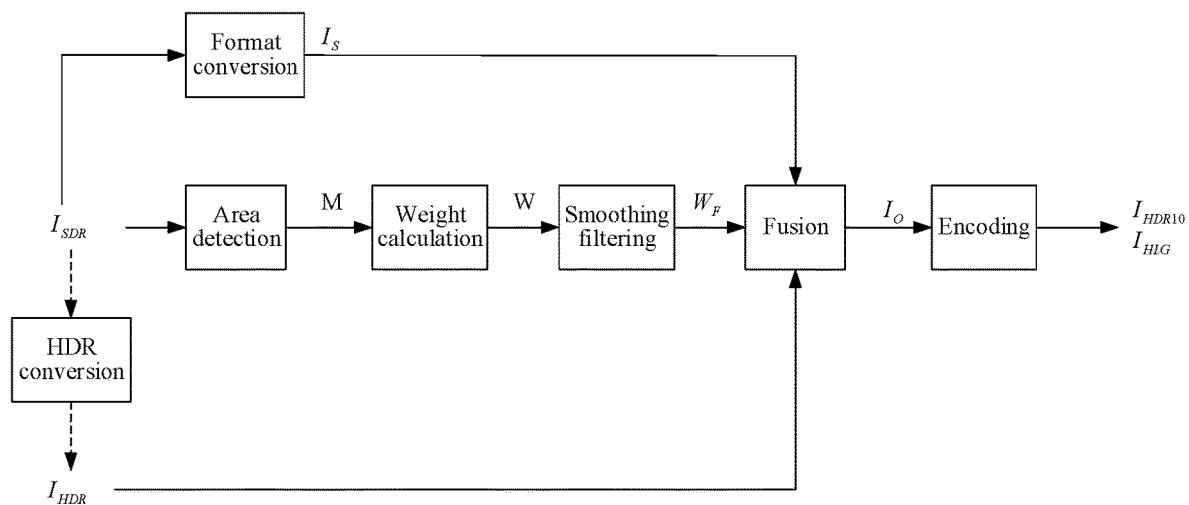
FIG. 8 is a schematic diagram of an image processing method according to some embodiments.

The image processing method provided in this disclosure is illustrated with reference to FIG. 8. In FIG. 8, $I_{SDR}$ is an image that uses a standard dynamic range to represent an image dynamic range, $I_S$ is an image which is generated by format conversion of $I_{SDR}$ and for which a high dynamic range is used for representing an image dynamic range but a display effect is still the standard dynamic range, and $I_{HDR}$ is an image that uses the high dynamic range to represent an image dynamic range and is consistent with the $I_{SDR}$ in image content. $I_{HDR}$ may be generated by HDR conversion of $I_{SDR}$ or may be a native image. Taking the original image as Is, the third image as $I_{SDR}$, and the fourth image as $I_{HDR}$ as an example, in an area detection stage, a position M of a fusion area is determined. In a weight calculation stage, an original weight map W is generated based on the position M of the fusion area. In a smoothing filtering stage, smoothing filtering is performed on the original weight map W to obtain smoothly filtered $W_F$. The terminal may use the smoothly filtered $W_F$ as the target weight map, or may adjust the smoothly filtered $W_F$ to obtain the target weight map. In a fusion stage, Is and $I_{HDR}$ are fused by using the target weight map, to generate a fusion image $I_O$. The fusion image $I_O$ is then encoded to obtain $I_{HRD10}$ or $I_{HLG}$.

In this embodiment, the smoothed weight value respectively corresponding to each pixel in the destination image is adjusted by using the preset weight adjustment value, to obtain the target weight value corresponding to each pixel in the destination image, so that the preset weight adjustment value may be used for adjusting a fusion effect, improving fusion flexibility.

In some embodiments, the adjusting the smoothed weight value of each pixel in the destination image by using a preset weight adjustment value, to obtain the target weight value of each pixel in the destination image includes: for each pixel in the destination image, multiplying the smoothed weight value of the pixel by the preset weight adjustment value, and using a multiplication result as the target weight value of the pixel.

In this embodiment, the smoothed weight value of the pixel is multiplied by the preset weight adjustment value, and the multiplication result is used as the target weight value of the pixel, so that the target weight value can be flexibly adjusted according to the preset weight adjustment value, making adjustment of the display effect more flexible.

The image processing method provided in this disclosure may be applied to a scenario of switching a video format in the field of network media. Switching a video format refers to switching a video with a first-type dynamic range to a video with a second-type dynamic range, for example, switching an SDR video to an HDR video. The image processing method provided in this disclosure is applied to a scenario of switching a video format, and smoothness during format switching is improved. Specifically, the terminal may play a first video. Each image in the first video is an SDR image. In response to a video switching instruction, the terminal may determine a video clip of a transition period from unplayed video data of the first video, perform format conversion on a video image in the video clip to generate a first image that is an HDR image, and acquire a second image that has consistent image content with the video image and is an HDR image. The terminal may determine a fusion weight map corresponding to a target image based on a display order of the video images in the video clip, determine one of the first image or the second image as a target image, and determine the other of the first image and the second image as a base image. Based on a fusion weight value corresponding to each pixel in the target image recorded in the fusion weight map, the terminal may fuse the target image into the base image to generate a fusion image corresponding to the video image, generate a fusion video based on the fusion image respectively corresponding to each video image in the video clip, play the fusion video during the transition period, and after the transition period ends, switch to playing the second video. Each image in the second video is an HDR image. This achieves a smooth transition during video switching.

The image processing method provided in this disclosure may be applied to a scenario of split-screen display of videos, so that split-screen display of an SDR video and an HDR video is achieved. Specifically, the first image generated by format conversion of a video image in an original video is acquired, the video image is represented by a first color representation, the first image is represented by a second color representation, and an image dynamic range of the first image is the same as that of the video image. The second image that is consistent with the video image in image content and represented by a second color representation is acquired, and an image dynamic range of the second image is wider than that of the video image. One of the first image or the second image is determined as the target image, and the other of the first image or the second image is determined as the base image. The fusion weight map corresponding to the target image is determined according to a display order of video images in the original video, the target image is fused into the base image to generate the fusion image corresponding to the video image based on the fusion weight value corresponding to each pixel in the target image recorded in the fusion weight map, and a fusion video is generated based on the fusion image respectively corresponding to each video image in the original video. The terminal may split a display screen to obtain a first split-screen area and a second split-screen area, play the original video in the first split-screen area, and play the fusion video in the second split-screen area. Therefore, by split-screen display on a device that supports HDR, a user may simultaneously watch and compare effects of SDR and HDR at different locations in space, such as the SDR effect of a video displayed on a left side of the screen and the HDR effect of a video displayed on a right side of the screen.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this disclosure, execution of the steps is not strictly limited, and the steps may be performed in other sequences. In addition, at least some of the steps in the embodiments may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Based on the same inventive concept, embodiments of this disclosure further provide an image processing apparatus for implementing the foregoing image processing method. Solutions to a problem provided by the apparatus are similar to the solutions described in the method. Therefore, for the specific limitations in one or more image processing apparatus embodiments provided below, refer to the foregoing limitations on the image processing method. Details are not described herein again.

Figure 9:
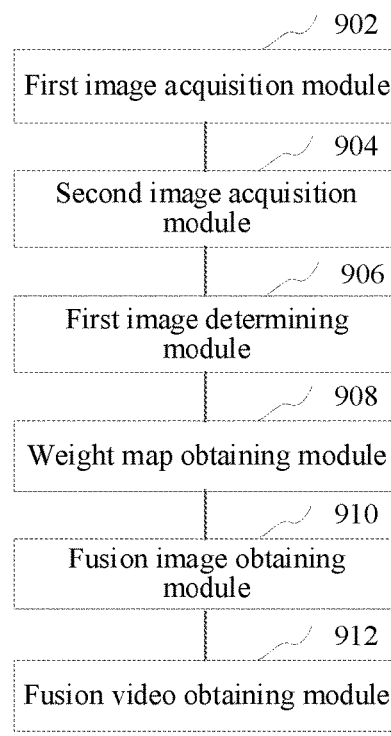
FIG. 9 is a block diagram of a structure of an image processing apparatus according to some embodiments.

In some embodiments, as shown in FIG. 9, an image processing apparatus is provided, including: a first image acquisition module 902, a second image acquisition module 904, a first image determining module 906, a weight map obtaining module 908, a fusion image obtaining module 910, and a fusion video obtaining module 912.

The first image acquisition module 902 is configured to: for each video image in a plurality of video images of an original video, acquire a first image generated by format conversion of a targeted video image. Each video image is represented by a first color representation, the first image is represented by a second color representation, an image dynamic range supported by the second color representation is wider than an image dynamic range supported by the first color representation, and an image dynamic range of the first image is the same as an image dynamic range of the targeted video image.

The second image acquisition module 904 is configured to acquire a second image. The second image has consistent image content with the targeted video image and is represented by the second color representation, and an image dynamic range of the second image is wider than the image dynamic range of the targeted video image.

The first image determining module 906 is configured to use one of the first image or the second image as a target image, and use the other of the first image or the second image as a base image.

The weight map obtaining module 908 is configured to determine a fusion weight value of each pixel in the target image according to a display order of the targeted video image in the original video, and generate a fusion weight map based on the fusion weight value of each pixel in the target image.

The fusion image obtaining module 910 is configured to fuse the target image and the base image based on the fusion weight map, to generate a fusion image corresponding to the targeted video image.

The fusion video obtaining module 912 is configured to generate a fusion video based on fusion images respectively corresponding to the plurality of video images.

In some embodiments, the weight map obtaining module 908 is further configured to: determine a quantity of video images between a starting image in the original video and the targeted video image, to obtain a first quantity; determine the fusion weight value of each pixel in the target image according to the first quantity, the fusion weight value of the pixel being in a positive correlation with the first quantity; and generate a fusion weight map corresponding to the target image based on the fusion weight value of each pixel in the target image.

In some embodiments, the weight map obtaining module 908 is further configured to: determine a quantity of video images between the starting image and an end image in the original video, to obtain a second quantity; and determine the fusion weight value of each pixel in the target image according to a relative relationship between the first quantity and the second quantity.

In some embodiments, the weight map obtaining module 908 is further configured to: obtain a first initial weight value of each pixel in the target image according to a ratio of the first quantity to the second quantity; and adjust the first initial weight value of each pixel in the target image by using a preset weight adjustment value, to obtain the fusion weight value of each pixel in the target image.

In some embodiments, the weight map obtaining module 908 is further configured to: for each pixel in the target image, multiply the first initial weight value of the pixel by the preset weight adjustment value, and determine a multiplication result as the fusion weight value of the pixel.

In some embodiments, the weight map obtaining module 908 is further configured to: determine a first image area from the base image according to a preset area determining manner; determine a second image area from the target image according to a position of the first image area in the base image; determine a quantity of video images between the starting image and an end image in the original video, to obtain a second quantity; determine a second initial weight value of each pixel in the second image area according to a ratio of the first quantity to the second quantity; determine a first preset value as a second initial weight value of each pixel outside the second image area in the target image; and determine the fusion weight value of each pixel in the target image based on the second initial weight value of each pixel in the target image.

In some embodiments, the weight map obtaining module 908 is further configured to smooth the second initial weight value of each pixel in the target image, to obtain the fusion weight value of each pixel in the target image.

In some embodiments, the acquiring a second image includes: performing image enhancement processing on the first image to obtain the second image, the image enhancement processing being image processing that widens an image dynamic range.

In some embodiments, the fusion image obtaining module 910 is further configured to: for each pixel position in the target image, determine a pixel at a targeted pixel position in the base image; determine a fusion weight value of the pixel at the targeted pixel position in the base image according to a fusion weight value of a pixel at the targeted pixel position in the target image; use the fusion weight values of the pixel at the targeted pixel position in the target image and in the base image to fuse a pixel value of the pixel at the targeted pixel position in the target image to a pixel value of the pixel at the targeted pixel position in the base image, to obtain a fusion pixel value at the targeted pixel position; and generate a fusion image corresponding to the targeted video image based on a fusion pixel value at each pixel position in the target image.

In some embodiments, the first image acquisition module 902 is further configured to: play a first video, the first video is represented by the first color representation; receive a video switching instruction; determine, in response to the video switching instruction, a transition period from responding to the video switching instruction to switching to a second video, and extract a video clip of the transition period from the first video, to obtain the original video, the second video having consistent content with the first video and being represented by the second color representation; switch from playing the first video to playing the fusion video, at the beginning of the transition period; and switch to playing the second video after the transition period ends.

In some embodiments, the first image acquisition module 902 is further configured to switch to playing the second video after the playing the fusion video ends.

Figure 10:
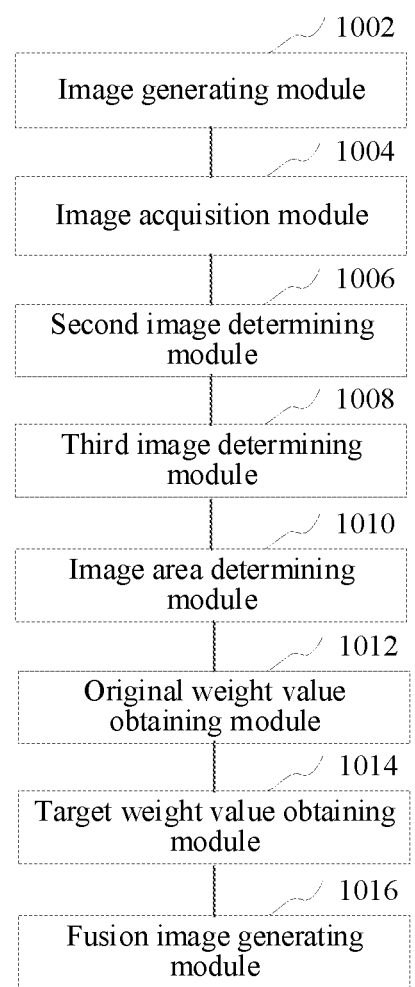
FIG. 10 is a block diagram of a structure of an image processing apparatus according to some embodiments.

In some embodiments, as shown in FIG. 10, an image processing apparatus is provided, including: An image generating module 1002, an image acquisition module 1004, a second image determining module 1006, a third image determining module 1008, an image area determining module 1010, an original weight value obtaining module 1012, a target weight value obtaining module 1014, and a fusion image generating module 1016.

The image generating module 1002 is configured to generate a third image by performing format conversion on an original image. The original image is represented by a first color representation, the third image is represented by a second color representation, and an image dynamic range supported by the second color representation is wider than an image dynamic range supported by the first color representation.

The image acquisition module 1004 is configured to acquire a fourth image. The fourth image has consistent image content with the original image and is represented by the second color representation, and an image dynamic range of the fourth image is wider than an image dynamic range of the original image.

The second image determining module 1006 is configured to use one of the third image or the fourth image as a destination image, and use the other of the third image or the fourth image as a source image.

The third image determining module 1008 is configured to determine a third image area from the source image according to a preset area determining manner.

The image area determining module 1010 is configured to determine a fourth image area from the destination image according to a position of the third image area in the source image.

The original weight value obtaining module 1012 is configured to use a second preset value as an original weight value of each pixel in the second image area, and use a first preset value as an original weight value of each pixel outside the second image area in the destination image.

The target weight value obtaining module 1014 is configured to smooth an original weight value of each pixel in the destination image, to obtain a target weight value of each pixel in the destination image.

The fusion image generating module 1016 is configured to fuse the destination image and the source image based on the target weight value of each pixel in the destination image, to generate a fusion image corresponding to the original image.

In some embodiments, the image acquisition module 1004 is further configured to perform image enhancement processing on the third image to obtain the fourth image. The image enhancement processing is image processing that widens an image dynamic range.

In some embodiments, the target weight value obtaining module 1014 is further configured to: smooth an original weight value of each pixel, to obtain a smoothed weight value of each pixel in the destination image; and adjust the smoothed weight value of each pixel in the destination image by using a preset weight adjustment value, to obtain the target weight value of each pixel in the destination image.

In some embodiments, the target weight value obtaining module 1014 is further configured to: for each pixel in the destination image, multiply the smoothed weight value of the pixel by the preset weight adjustment value, and use a multiplication result as the target weight value of the pixel.

All or some of modules in the foregoing image processing apparatus may be implemented by using software, hardware, or a combination thereof. Each of the foregoing modules may be embedded in or independent of a processor of a computer device in a form of hardware, or may be stored in a memory of a computer device in a form of software, so that the processor can call and perform the operations corresponding to the foregoing modules.

Figure 11:
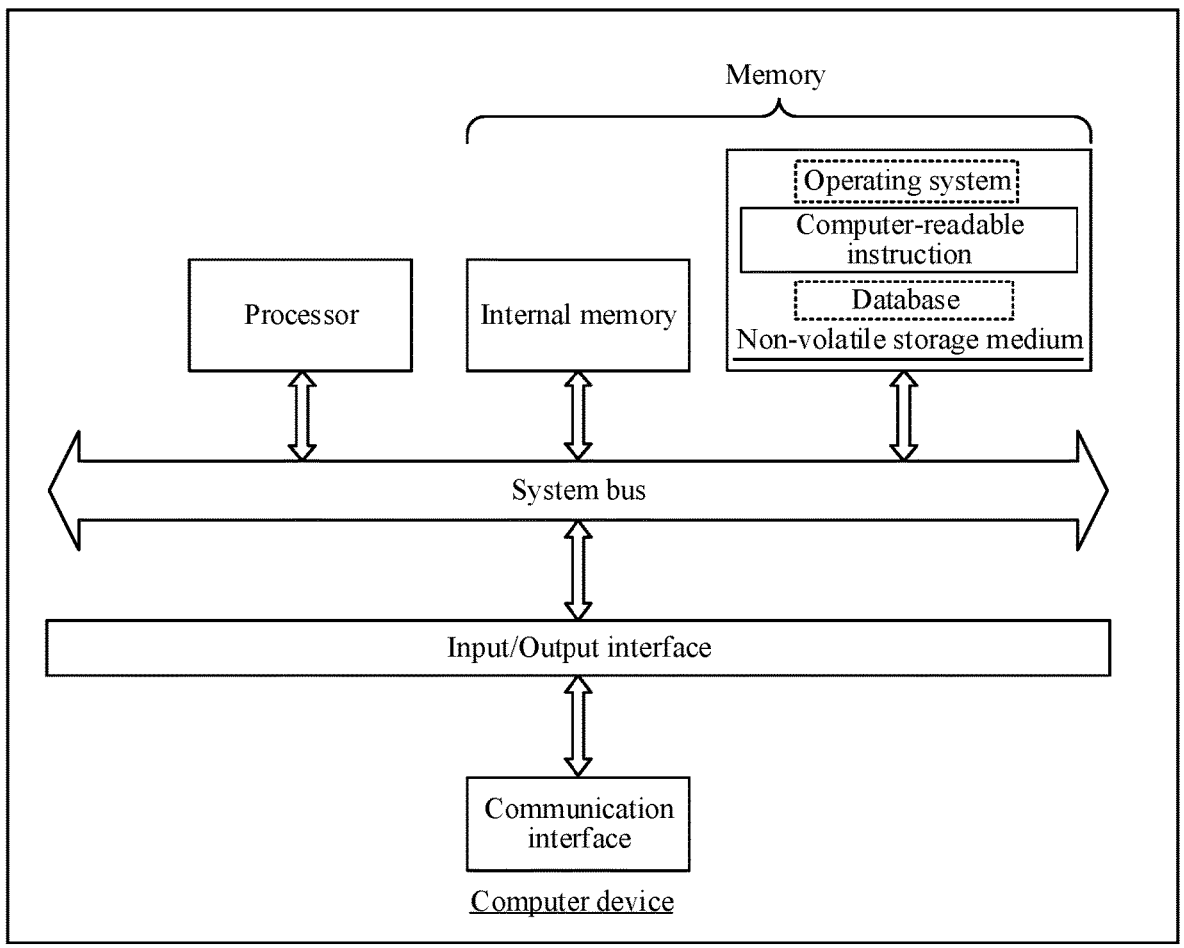
FIG. 11 is a diagram of an internal structure of a computer device according to some embodiments.

In some embodiments, a computer device is provided. The computer device may be a server, and an internal structure diagram of the computer device may be as shown in FIG. 11. The computer device includes a processor, a memory, an input/output interface (I/O), and a communication interface. The processor, memory, and input/output interface are connected by using a system bus, and the communication interface is connected to the system bus by using the input/output interface. The processor of the computer device is configured to provide computing and control capabilities. The memory of the computer device includes a non-volatile storage medium and an internal memory. The non-volatile storage medium has an operating system, computer-readable instructions, and a database stored herein. The internal memory provides an environment for execution of the operating system and computer-readable instructions in the non-volatile storage medium. The database of the computer device is configured to store data in the image processing method. The input/output interface of the computer device is configured to exchange information between the processor and an external device. The communication interface of the computer device is configured to communicate with an external terminal by a network connection. The computer-readable instructions, when executed by the processor, implement an image processing method.

Figure 12:
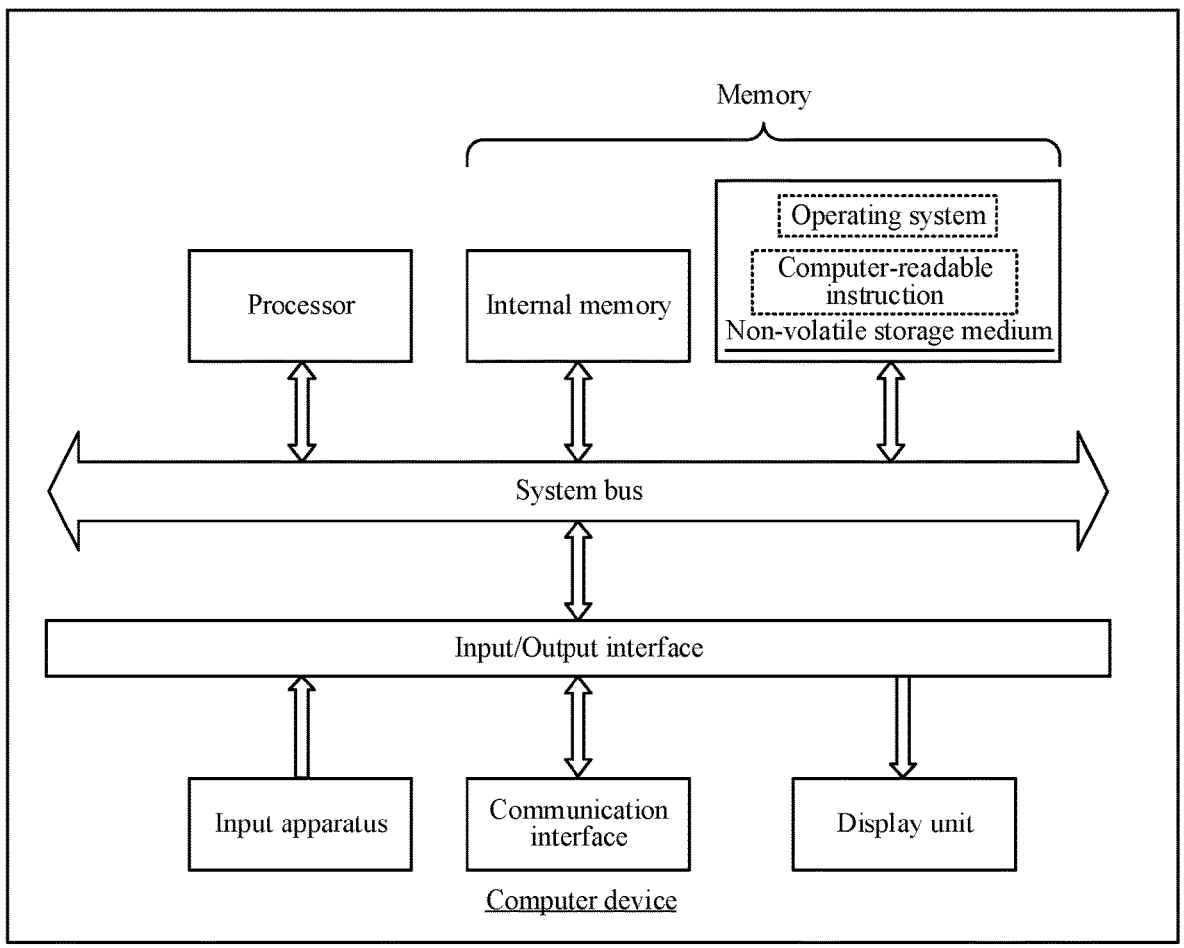
FIG. 12 is a diagram of an internal structure of a computer device according to some embodiments.

In some embodiments, a computer device is provided. The computer device may be a terminal, and an internal structure diagram of the computer device may be as shown in FIG. 12. The computer device includes a processor, a memory, an input/output interface, a communication interface, a display unit, and an input apparatus. The processor, memory, and input/output interface are connected by using a system bus, and the communication interface, display unit, and input apparatus are connected to the system bus by using the input/output interface. The processor of the computer device is configured to provide computing and control capabilities. The memory of the computer device includes a non-volatile storage medium and an internal memory. The non-volatile storage medium has an operating system and computer-readable instructions stored herein. The internal memory provides an environment for execution of the operating system and computer-readable instructions in the non-volatile storage medium. The input/output interface of the computer device is configured to exchange information between the processor and an external device. The communication interface of the computer device is configured to communicate with an external terminal in a wired or wireless manner. The wireless manner may be implemented by WIFI, a mobile cellular network, near field communication (NFC), or another technology. The computer-readable instructions, when executed by the processor, implement an image processing method. The display unit of the computer device is configured to form a visible picture and may be a display screen, a projection device, or a virtual reality imaging device. The display screen may be a liquid crystal display screen or an electronic ink display screen. The input apparatus of the computer device may be a touch layer covering a display screen, and may be a button, trackball or touch pad provided on a computer device housing, and may also be an external keyboard, a touch pad or a mouse, or the like.

A person skilled in the art may understand that, the structures shown in FIG. 11 and FIG. 12 are merely exemplary block diagrams of partial structures related to a solution in this disclosure, and do not constitute a limitation to the computer device to which the solution in this disclosure is applied. Specifically, the computer device may include more or fewer components than those shown in the figures, or have some components combined, or have a different component deployment.

In some embodiments, a computer device is provided, including a memory and one or more processors. The memory has computer-readable instructions stored therein. When the processor executes the computer-readable instructions, the steps in the foregoing image processing method are implemented.

In some embodiments, one or more readable storage media are provided. The readable storage media include a non-transitory computer-readable storage medium, for example. The readable storage media has computer-readable instructions stored thereon. The computer-readable instructions, when executed by a processor, implement the steps in the foregoing image processing method.

In some embodiments, a computer program product is provided, including computer-readable instructions. The computer-readable instructions, when executed by one or more processors, implement the steps in the foregoing image processing method.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

User information (including but not limited to user equipment information, user personal information, and the like) and data (including but not limited to data used for analysis, stored data, displayed data, and the like) in this disclosure are all information and data authorized by a user or fully authorized by all parties, and collection, use and processing of relevant data need to comply with relevant laws, regulations and standards of relevant countries and regions.

A person of ordinary skill in the art may understand that all or some of procedures of the method in the foregoing embodiments may be implemented by instructing relevant hardware by using computer-readable instructions. The computer-readable instructions may be stored in a non-volatile computer-readable storage medium. When the computer-readable instructions are executed, the processes of the embodiments of the methods may be included. Any reference to the memory, database or another medium used in the embodiments provided in this disclosure may include at least one of a non-volatile and a volatile memory. The non-volatile memory may include a read-only memory (ROM), a magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, and the like. The volatile memory may include a random access memory (RAM) or an external cache memory, or the like. As an illustration but not a limitation, the RAM may be in various forms, such as a static random access memory (SRAM) or a dynamic random access memory (DRAM). The databases in the embodiments provided in this disclosure may include at least one of a relational database and a non-relational database. The non-relational database may include a blockchain-based distributed database, and the like. This is not limited herein. The processor in the embodiments provided in this disclosure may be a general-purpose processor, a central processing unit, a graphics processor, a digital signal processor, a programmable logic device, a data processing logic device based on quantum computing, and the like. This is not limited herein.

Technical features of the foregoing embodiments may be combined in various manners. To make description concise, not all possible combinations of the technical features in the foregoing embodiments are described. However, other combinations of these technical features shall be considered as falling within the scope of this disclosure provided that no conflict exists.

The foregoing embodiments show only several exemplary implementations of this disclosure and are described in detail, which, however, are not to be construed as a limitation to the patent scope of this disclosure. For a person of ordinary skill in the art, several transformations and improvements may be made without departing from the idea of this disclosure. These transformations and improvements belong to the protection scope of this disclosure.

What is claimed is:

1. An image processing method, comprising:
   for each video image of a plurality of video images of an original video,
   acquiring a first image generated by format conversion of the respective video image, the respective video image being represented by a first color representation, the first image being represented by a second color representation, an image dynamic range supported by the second color representation being wider than an image dynamic range supported by the first color representation, and an image dynamic range of the first image being the same as an image dynamic range of the respective video image;
   acquiring a second image that is based on the respective video image, the second image being represented by the second color representation, and an image dynamic range of the second image being wider than the image dynamic range of the respective video image;
   determining a fusion weight value of each pixel of a plurality of pixels in a target image according to a display order of the respective video image in the original video, the target image being one of the first image and the second image;
   generating a fusion weight map based on the fusion weight value of each pixel of the plurality of pixels in the target image;
   generating a fusion image corresponding to the respective video image based on the target image, a base image, and the fusion weight map, the base image being another one of the first image and the second image; and
   generating a fusion video based on the fusion images corresponding to the plurality of video images.

2. The method according to claim 1, wherein the determining the fusion weight value of each pixel of the plurality of pixels in the target image comprises:
   determining a first quantity of the plurality of video images between a starting image in the original video and the respective video image;
   determining the fusion weight values of the plurality of pixels in the target image according to the first quantity, the fusion weight values of the plurality of pixels being in a positive correlation with the first quantity; and
   generating the fusion weight map corresponding to the target image based on the fusion weight values of the plurality of pixels in the target image.

3. The method according to claim 2, wherein the determining the fusion weight values of the plurality of pixels in the target image according to the first quantity comprises:
   determining a second quantity of the plurality of video images between the starting image and an end image in the original video; and
   determining the fusion weight values of the plurality of pixels in the target image according to a relative relationship between the first quantity and the second quantity.

4. The method according to claim 3, wherein the determining the fusion weight values of the plurality of pixels in the target image according to the relative relationship comprises:
   obtaining first initial weight values of the plurality of pixels in the target image according to a ratio of the first quantity to the second quantity; and
   adjusting the first initial weight values of the plurality of pixels in the target image according to a preset weight adjustment value, to obtain the fusion weight values of the plurality of pixels in the target image.

5. The method according to claim 4, wherein
   the fusion weight value for each pixel of the plurality of pixels in the target image is equal to the first initial weight value of the respective pixel multiplied by the preset weight adjustment value.

6. The method according to claim 2, wherein the determining the fusion weight values of the plurality of pixels in the target image according to the first quantity comprises:
   determining a first image area from the base image;
   determining a second image area from the target image according to a position of the first image area in the base image;
   determining a second quantity of the plurality of video images between the starting image and an end image in the original video;
   determining second initial weight values of the plurality of pixels in the second image area according to a ratio of the first quantity to the second quantity;
   determining a first preset value as a second initial weight value of each pixel outside the second image area in the target image; and
   determining the fusion weight values of the plurality of pixels in the target image based on the second initial weight values of the plurality of pixels in the target image.

7. The method according to claim 6, wherein the determining the fusion weight values of the plurality of pixels in the target image based on the second initial weight values of the plurality of pixels in the target image comprises:
   smoothing the second initial weight values of the plurality of pixels in the target image, to obtain the fusion weight values of the plurality of pixels in the target image.

8. The method according to claim 1, wherein the acquiring the second image comprises:
   performing image enhancement processing on the first image to obtain the second image, the image enhancement processing being configured to widen an image dynamic range.

9. The method according to claim 1, wherein the generating the fusion image comprises:
for each pixel position in the respective image,
determining a pixel at the respective pixel position in the base image,
determining a fusion weight value of the pixel at the respective pixel position in the base image according to the fusion weight value of the pixel at the respective pixel position in the target image, and
determining a fusion pixel value at the respective pixel position based on the fusion weight value of the pixel at the respective pixel position in the target image and the fusion weight value of the pixel at the respective pixel position in the base image; and
generating a fusion image corresponding to the respective video image based on the fusion pixel value at each pixel position in the respective image.

10. The method according to claim 1, further comprising:
playing a first video, the first video being represented by the first color representation;
receiving a video switching instruction;
determining, in response to the video switching instruction, a transition period from responding to the video switching instruction to switching to a second video, and extracting a video clip of the transition period from the first video, to obtain the original video, the second video being represented by the second color representation;
switching from playing the first video to playing the fusion video, at the beginning of the transition period; and
switching to playing the second video after the transition period ends.

11. The method according to claim 10, wherein the switching to playing the second video after the transition period ends comprises:
switching to playing the second video after the playing the fusion video ends.

12. An image processing method, further comprising:
generating a first image by performing format conversion on an original image, the original image being represented by a first color representation, the first image being represented by a second color representation, and an image dynamic range supported by the second color representation being wider than an image dynamic range supported by the first color representation;
acquiring a second image that is based on the original image, the second image being represented by the second color representation, and an image dynamic range of the second image being wider than an image dynamic range of the original image;
determining a first image area from a source image, the source image being one of the first image and the second image;
determining a second image area from a destination image according to a position of the first image area in the source image, the destination image being another one of the first image and the second image;
smoothing an original weight value of each pixel of a plurality of pixels in the destination image, to obtain target weight values of the plurality of pixels in the destination image; and
generating a fusion image corresponding to the original image based on the destination image, the source image, and the target weight values of the plurality of pixels in the destination image.

13. The method according to claim 12, wherein the acquiring the second image comprises:
performing image enhancement processing on the first image to obtain the second image, the image enhancement processing being configured to widen an image dynamic range.

14. The method according to claim 12, wherein the smoothing the original weight value of each pixel of the plurality of pixels in the destination image comprises:
smoothing the original weight value of each pixel of the plurality of pixels, to obtain smoothed weight values of the plurality of pixels in the destination image; and
adjusting the smoothed weight values of the plurality of pixels in the destination image based on a preset weight adjustment value, to obtain the target weight values of the plurality of pixels in the destination image.

15. The method according to claim 14, wherein the target weight value of each of the plurality of pixels in the destination image is equal to the smoothed weight value of the respective pixel multiplied by the preset weight adjustment value.

16. An image processing apparatus, comprising:
processing circuitry configured to:
for each video image of a plurality of video images of an original video,
acquire a first image generated by format conversion of the respective video image, the respective video image being represented by a first color representation, the first image being represented by a second color representation, an image dynamic range supported by the second color representation being wider than an image dynamic range supported by the first color representation, and an image dynamic range of the first image being the same as an image dynamic range of the respective video image,
acquire a second image that is based on the respective video image, the second image being represented by the second color representation, and an image dynamic range of the second image being wider than the image dynamic range of the respective video image,
determine a fusion weight value of each pixel of a plurality of pixels in a target image according to a display order of the respective video image in the original video, the target image being one of the first image and the second image,
generate a fusion weight map based on the fusion weight value of each pixel of the plurality of pixels in the target image, and
generate a fusion image corresponding to the respective video image based on the target image, a base image, and the fusion weight map, the base image being another one of the first image and the second image; and
generate a fusion video based on the fusion images corresponding to the plurality of video images.

17. The image processing apparatus according to claim 16, wherein the processing circuitry is configured to:
determine a first quantity of the plurality of video images between a starting image in the original video and the respective video image;
determine the fusion weight values of the plurality of pixels in the target image according to the first quantity, the fusion weight values of the plurality of pixels being in a positive correlation with the first quantity; and generate the fusion weight map corresponding to the target image based on the fusion weight values of the plurality of pixels in the target image.

18. The image processing apparatus according to claim 17, wherein the processing circuitry is configured to:
determine a second quantity of the plurality of video images between the starting image and an end image in the original video; and
determine the fusion weight values of the plurality of pixels in the target image according to a relative relationship between the first quantity and the second quantity.

19. The image processing apparatus according to claim 18, wherein the processing circuitry is configured to:
obtain first initial weight values of the plurality of pixels in the target image according to a ratio of the first quantity to the second quantity; and
adjust the first initial weight values of the plurality of pixels in the target image according to a preset weight adjustment value, to obtain the fusion weight values of the plurality of pixels in the target image.

20. The image processing apparatus according to claim 19, wherein
the fusion weight value for each pixel of the plurality of pixels in the target image is equal to the first initial weight value of the respective pixel multiplied by the preset weight adjustment value.

* * * * *